United States Patent
Thomas

(10) Patent No.: US 7,469,662 B2
(45) Date of Patent: *Dec. 30, 2008

(54) HOMOGENEOUS CHARGE COMPRESSION IGNITION ENGINE WITH COMBUSTION PHASING

(75) Inventor: Charles Russell Thomas, Covington, LA (US)

(73) Assignee: Thomas Engine Company, LLC, Boulder, CO (US)

(*) Notice: Subject to any disclaimer, the term of this patent is extended or adjusted under 35 U.S.C. 154(b) by 0 days.

This patent is subject to a terminal disclaimer.

(21) Appl. No.: 11/255,804

(22) Filed: Oct. 21, 2005

(65) Prior Publication Data

US 2006/0037567 A1   Feb. 23, 2006

Related U.S. Application Data

(60) Division of application No. 10/791,453, filed on Mar. 2, 2004, now Pat. No. 6,986,342, which is a division of application No. 10/021,192, filed on Oct. 30, 2001, now Pat. No. 6,698,394, and a continuation-in-part of application No. 09/937,543, filed as application No. PCT/US00/07743 on Mar. 12, 2000, now abandoned.

(60) Provisional application No. 60/244,349, filed on Oct. 30, 2000, provisional application No. 60/252,280, filed on Nov. 21, 2000, provisional application No. 60/260,256, filed on Jan. 8, 2001, provisional application No. 60/261,060, filed on Jan. 11, 2001, provisional application No. 60/267,598, filed on Feb. 9, 2001, provisional application No. 60/125,798, filed on Mar. 23, 1999, provisional application No. 60/134,457, filed on May 17, 1999, provisional application No. 60/141,166, filed on Jun. 25, 1999, provisional application No. 60/147,584, filed on Aug. 6, 1999.

(51) Int. Cl.
*F01B 3/00* (2006.01)
*F01B 7/02* (2006.01)
*F02B 75/26* (2006.01)
*F02B 75/28* (2006.01)
*F02B 25/08* (2006.01)
*F02B 19/10* (2006.01)
*F02B 75/04* (2006.01)
*F02M 7/00* (2006.01)
*F02G 5/00* (2006.01)

(52) U.S. Cl. .............................. 123/43 A; 123/43 AA; 123/51 B; 123/435; 123/551; 123/258; 123/78 D

(58) Field of Classification Search ................ 123/48 D, 123/78 D, 253, 258–268, 43 A, 43 AA, 310, 123/51 B, 551

See application file for complete search history.

(56) References Cited

U.S. PATENT DOCUMENTS 127,747 A   6/1872   Donnelly (Continued)

FOREIGN PATENT DOCUMENTS

CA        2307927 A1 * 11/2001

(Continued)

OTHER PUBLICATIONS

Stanglmaier R., Ryan T. and Souder J., "HCCI Operation of a Dual-Fuel Natural Gas Engine for Improved Fuel Efficiency and Ultra-Low NOxEmissions at Low to Moderate Engine Loads", 2001, SAE Paper 2001-01-1897. cited by other.

(Continued)

*Primary Examiner*—Thai-Ba Trieu
(74) *Attorney, Agent, or Firm*—Gifford, Krass, Sprinkle, Anderson & Citkowski, P.C.

(57) ABSTRACT

The relative combustion phasing of a homogenous charge compression ignition engine is controlled by controlling the introduction of ions and free radicals to cylinders in the engine. The engine has an engine housing with at least a first and second cylinder and an intake system that introduces a combustible mixture of air and fuel to the cylinders. A piston is disposed in each of the cylinders and is operable to compress a combustible mixture until the mixture auto ignites, without the introduction of a spark.

7 Claims, 12 Drawing Sheets

U.S. PATENT DOCUMENTS

| | | |
|---|---|---|
| 174,590 A | 3/1876 | Tesseyman |
| 227,319 A | 5/1880 | Tegnander |
| 334,593 A | 6/1886 | Peabody |
| 344,593 A | 6/1886 | Peabody |
| 349,775 A | 6/1886 | Wood |
| 367,029 A | 7/1887 | Esty |
| 571,129 A | 11/1896 | Schumacher |
| 574,762 A | 1/1897 | Rowbotham |
| 593,248 A | 11/1897 | Smith |
| 600,971 A | 3/1898 | Singer |
| 657,409 A | 9/1900 | Gould |
| 669,234 A | 3/1901 | Fuhrmann et al. |
| 697,649 A | 4/1902 | McLean |
| 706,320 A | 8/1902 | Jenney |
| 706,494 A | 8/1902 | Minogue |
| 749,864 A | 1/1904 | James |
| 766,410 A | 8/1904 | Alger |
| 771,037 A | 9/1904 | Beck |
| 782,597 A | 2/1905 | Cheshire |
| 815,911 A | 3/1906 | Eddy |
| 818,609 A | 4/1906 | Butikofer |
| 839,300 A | 12/1906 | Krohn |
| 848,665 A | 4/1907 | Lombard |
| 850,295 A | 4/1907 | Chappell |
| 851,293 A | 4/1907 | Lehberger |
| 868,497 A | 10/1907 | Smith |
| 893,038 A | 7/1908 | Vadam |
| 893,181 A | 7/1908 | Macomber |
| 896,448 A | 8/1908 | Herndon |
| 897,963 A | 9/1908 | Clayton et al. |
| 928,715 A | 7/1909 | Thurber |
| 933,316 A | 9/1909 | Macomber |
| 945,232 A | 1/1910 | Harding |
| 947,008 A | 1/1910 | Williams et al. |
| 968,969 A | 8/1910 | Ord |
| 972,966 A | 10/1910 | Williams |
| 980,491 A | 1/1911 | Coleman |
| 998,363 A | 7/1911 | De Lukacsevics |
| 999,047 A | 7/1911 | Lehberger |
| 1,033,701 A | 7/1912 | Iochum |
| 1,038,537 A | 9/1912 | Dexter |
| 1,042,018 A | 10/1912 | Macomber |
| 1,050,456 A | 1/1913 | Helin |
| 1,053,799 A | 2/1913 | Eslick |
| 1,063,456 A | 6/1913 | Looney |
| 1,065,604 A | 6/1913 | Gray |
| 1,076,179 A | 10/1913 | Whitehead |
| 1,076,807 A | 10/1913 | Anderson |
| 1,080,123 A | 12/1913 | Pratt |
| 1,087,861 A | 2/1914 | Alexander et al. |
| 1,097,150 A | 5/1914 | Vallez |
| 1,104,539 A | 7/1914 | Ord |
| 1,132,161 A | 3/1915 | Cassady et al. |
| 1,132,581 A | 3/1915 | Hein |
| 1,136,363 A | 4/1915 | Pepper |
| 1,142,367 A | 6/1915 | Reiche |
| 1,147,313 A | 7/1915 | Desort |
| 1,170,918 A | 2/1916 | Lundy |
| 1,177,126 A | 3/1916 | Miller |
| 1,177,609 A | 4/1916 | Edwards |
| 1,181,463 A | 5/1916 | La Fontaine |
| 1,183,470 A | 5/1916 | Lee |
| 1,183,777 A | 5/1916 | Soules |
| 1,189,477 A | 7/1916 | Peytoureau |
| 1,202,598 A | 10/1916 | Simpson |
| 1,204,892 A | 11/1916 | Macomber |
| 1,206,800 A | 12/1916 | Batt |
| 1,207,846 A | 12/1916 | Bradford |
| 1,209,995 A | 12/1916 | Ord |
| 1,215,434 A | 2/1917 | Trebert |
| 1,219,377 A | 3/1917 | Davidson |
| 1,222,475 A | 4/1917 | Sears |
| 1,226,789 A | 5/1917 | Macomber |
| 1,228,101 A | 5/1917 | Dutton |
| 1,229,009 A | 6/1917 | Allison |
| 1,250,709 A | 12/1917 | Tanner |
| 1,255,664 A | 2/1918 | Syger |
| 1,256,382 A | 2/1918 | Scott et al. |
| 1,261,111 A | 4/1918 | Fasey et al. |
| 1,275,494 A | 8/1918 | Storle |
| 1,276,346 A | 8/1918 | Gould |
| 1,277,964 A | 9/1918 | Lovelace |
| 1,282,179 A | 10/1918 | Brackett |
| 1,282,180 A | 10/1918 | Brackett |
| 1,283,575 A | 11/1918 | Shepard |
| 1,289,424 A | 12/1918 | Faupel |
| 1,291,531 A | 1/1919 | James et al. |
| 1,293,733 A | 2/1919 | Duby |
| 1,298,191 A | 3/1919 | Fasey |
| 1,307,045 A | 6/1919 | Galbreath |
| 1,313,569 A | 6/1919 | Wilks et al. |
| 1,312,234 A | 8/1919 | Carlson |
| 1,316,679 A | 9/1919 | Brackett |
| 1,321,045 A | 11/1919 | Hutchinson |
| 1,321,046 A | 11/1919 | Hutchinson |
| 1,324,520 A | 12/1919 | Robbins |
| 1,324,534 A | 12/1919 | Ambrose |
| 1,328,261 A | 1/1920 | Blankenburg |
| 1,332,756 A | 3/1920 | Root |
| 1,332,948 A | 3/1920 | Murphy |
| 1,338,039 A | 4/1920 | Porter |
| 1,338,185 A | 4/1920 | Looney |
| 1,339,276 A | 5/1920 | Murphy |
| 1,345,808 A | 7/1920 | Reynolds |
| 1,345,940 A | 7/1920 | Looney |
| 1,347,762 A | 7/1920 | Shepard |
| 1,348,371 A | 8/1920 | Murphy |
| 1,366,636 A | 1/1921 | Conway |
| 1,370,856 A | 3/1921 | Thomson |
| 1,374,315 A | 4/1921 | Murphy |
| 1,374,915 A | 4/1921 | Fasey |
| 1,375,140 A | 4/1921 | Fasey |
| 1,377,383 A | 5/1921 | Bair |
| 1,377,899 A | 5/1921 | De Lukacsevics et al. |
| 1,379,774 A | 5/1921 | Murphy |
| 1,379,775 A | 5/1921 | Murphy |
| 1,382,485 A | 6/1921 | Lukacsevics |
| 1,384,344 A | 7/1921 | Powell |
| 1,389,873 A | 9/1921 | Hult |
| 1,389,967 A | 9/1921 | Murphy |
| 1,390,034 A | 9/1921 | Howard |
| 1,393,174 A | 10/1921 | Shepard |
| 1,405,224 A | 1/1922 | Kenmonth |
| 1,407,293 A | 2/1922 | Mott |
| 1,408,385 A | 2/1922 | Newton |
| 1,413,363 A | 4/1922 | Smith et al. |
| 1,427,632 A | 8/1922 | Pryor |
| 1,445,686 A | 2/1923 | Hult |
| 1,466,144 A | 8/1923 | Murphy |
| 1,466,276 A | 8/1923 | Egersdorfer |
| 1,476,307 A | 12/1923 | Toth |
| 1,487,338 A | 3/1924 | Kelley |
| 1,492,215 A | 4/1924 | Nedoma |
| 1,503,741 A | 8/1924 | Almen |
| 1,508,623 A | 9/1924 | Somervell |
| 1,529,687 A | 3/1925 | Bowen |
| 1,544,382 A | 6/1925 | Entler |
| 1,545,925 A | 7/1925 | Powell |
| 1,549,556 A | 8/1925 | Kennedy |
| 1,556,300 A | 10/1925 | Olsen |
| 1,565,184 A | 12/1925 | Miller |
| 1,568,378 A | 1/1926 | Gribojedoff |
| 1,569,525 A | 1/1926 | Owens |
| 1,604,474 A | 10/1926 | Nisbet |

| | | | | | | |
|---|---|---|---|---|---|---|
| 1,610,060 A | 12/1926 | Lind | | 2,076,334 A | 4/1937 | Burns |
| 1,614,476 A | 1/1927 | Hutchinson | | 2,083,510 A | 6/1937 | Stigers |
| 1,622,986 A | 3/1927 | Weingartner | | 2,091,949 A | 7/1937 | Alfaro |
| 1,625,841 A | 4/1927 | Wright | | 2,099,983 A | 11/1937 | Lake |
| 1,628,100 A | 5/1927 | Bacon | | 2,118,804 A | 5/1938 | Anderson |
| 1,629,686 A | 5/1927 | Dreisbach | | 2,121,706 A | 6/1938 | Little |
| 1,655,738 A | 1/1928 | Rasck | | 2,126,860 A | 8/1938 | Alfaro |
| 1,661,582 A | 3/1928 | Sxydlowski | | 2,155,455 A | 4/1939 | Thoma |
| 1,664,086 A | 3/1928 | Olsen | | 2,188,630 A | 1/1940 | Grahman |
| 1,673,632 A | 6/1928 | Mattson | | 2,201,893 A | 5/1940 | Gadoux et al. |
| 1,675,629 A | 7/1928 | Andrews | | 2,205,953 A | 6/1940 | Hall |
| 1,693,024 A | 11/1928 | Drummond | | 2,237,989 A | 4/1941 | Herrmann |
| 1,696,676 A | 12/1928 | Fuhr | | 2,239,063 A | 4/1941 | Taylor et al. |
| RE17,273 E | 4/1929 | Michell | | 2,243,817 A | 5/1941 | Herrmann |
| 1,707,779 A | 4/1929 | Atkeson | | 2,243,820 A | 5/1941 | Herrmann |
| 1,716,621 A | 6/1929 | Cizek | | 2,243,821 A | 5/1941 | Herrmann |
| 1,717,999 A | 6/1929 | Olsen | | 2,243,822 A | 5/1941 | Herrmann |
| 1,738,512 A | 12/1929 | Andrews | | 2,250,512 A | 7/1941 | Vickers |
| 1,745,821 A | 2/1930 | Gribojedoff | | 2,269,106 A | 1/1942 | Hoffman |
| 1,757,778 A | 5/1930 | Mehlum | | 2,272,691 A | 2/1942 | Chilton |
| 1,762,650 A | 6/1930 | Boughton | | 2,274,097 A | 2/1942 | Sheerer |
| 1,770,311 A | 7/1930 | Keith | | 2,276,772 A | 3/1942 | Heap |
| 1,772,531 A | 8/1930 | Williams | | 2,280,375 A | 4/1942 | Chilton |
| 1,772,977 A | 8/1930 | Arrighi | | 2,301,175 A | 11/1942 | Earnshaw et al. |
| 1,774,713 A | 9/1930 | Jahn et al. | | 2,320,526 A | 6/1943 | Landis |
| 1,779,032 A | 10/1930 | Cathcart | | 2,326,912 A | 8/1943 | Allison |
| 1,788,140 A | 1/1931 | Woolson | | 2,337,543 A | 12/1943 | Christopher |
| 1,788,259 A | 1/1931 | Ward et al. | | 2,353,313 A | 7/1944 | Lane |
| 1,793,107 A | 2/1931 | Livingston | | 2,366,595 A | 1/1945 | Christopher |
| 1,796,453 A | 3/1931 | Goehler | | 2,368,444 A | 1/1945 | Blanding |
| 1,798,866 A | 3/1931 | Bleser | | 2,369,002 A | 2/1945 | Allison |
| 1,799,772 A | 4/1931 | Wormley | | 2,382,280 A | 8/1945 | Allison |
| 1,804,598 A | 5/1931 | Earl | | 2,384,292 A | 9/1945 | Feroy |
| 1,807,087 A | 5/1931 | Finke | | 2,399,743 A | 5/1946 | Kahl |
| 1,808,083 A | 6/1931 | Tibbetts | | 2,401,466 A | 6/1946 | Davis et al. |
| 1,810,017 A | 6/1931 | Houston | | 2,406,292 A | 8/1946 | Hall |
| 1,813,259 A | 7/1931 | Schick | | 2,409,868 A | 10/1946 | Kahl |
| 1,828,353 A | 10/1931 | Bleser | | 2,417,487 A | 3/1947 | Hall |
| 1,838,974 A | 12/1931 | Williams | | 2,439,265 A | 4/1948 | Schroeder |
| 1,839,592 A | 1/1932 | Reynolds | | 2,444,764 A | 7/1948 | Baker |
| 1,846,961 A | 2/1932 | Greening | | 2,447,314 A | 8/1948 | Carroll |
| 1,851,416 A | 3/1932 | Bauer | | 2,456,164 A | 12/1948 | Youhouse |
| 1,857,000 A | 5/1932 | Kleschka | | 2,477,542 A | 7/1949 | Lane |
| 1,864,248 A | 6/1932 | Holmes | | 2,512,265 A | 6/1950 | Brigaudet |
| 1,866,398 A | 7/1932 | Craig | | 2,556,585 A | 6/1951 | Jarvinen |
| 1,867,504 A | 7/1932 | Franklin | | 2,567,576 A | 9/1951 | Palumbo |
| 1,871,973 A | 8/1932 | Finke | | 2,622,567 A | 12/1952 | Myard |
| 1,886,492 A | 8/1932 | Mattson | | 2,647,363 A | 8/1953 | Stott |
| 1,876,506 A | 9/1932 | Lee | | 2,650,676 A | 9/1953 | Jamotte |
| 1,878,767 A | 9/1932 | Freund | | 2,664,866 A | 1/1954 | Fulke |
| 1,880,224 A | 10/1932 | Wilsey | | 2,767,589 A | 10/1956 | Redrup et al. |
| 1,885,492 A | 11/1932 | Trew | | 2,770,140 A | 11/1956 | Palumbo |
| 1,896,449 A | 2/1933 | Kreidler | | 2,770,224 A | 11/1956 | Ericson |
| 1,910,315 A | 5/1933 | Bleser | | 2,776,649 A | 1/1957 | Fenske |
| 1,918,840 A | 7/1933 | Eriksen | | 2,781,749 A | 2/1957 | Stucke |
| 1,939,350 A | 12/1933 | Jendrassik | | 2,783,751 A | 3/1957 | Karfun |
| 1,945,727 A | 2/1934 | Braunwalder | | 2,856,781 A | 10/1958 | Forbes |
| 1,948,526 A | 2/1934 | Liles | | 2,875,701 A | 3/1959 | Ebert |
| 1,972,335 A | 9/1934 | Gardner | | 2,962,008 A | 11/1960 | Hopkins |
| 1,973,887 A | 9/1934 | Schick | | 2,966,899 A | 1/1961 | Hermann |
| 1,976,286 A | 10/1934 | Kreidler | | 2,994,188 A | 8/1961 | Howard |
| 1,987,699 A | 1/1935 | Moore | | 3,007,462 A * | 11/1961 | Balzer ..................... 123/51 B |
| 1,988,252 A | 1/1935 | Pears | | 3,039,676 A | 6/1962 | Mikina |
| 1,999,451 A | 4/1935 | Finlay | | 3,040,721 A | 6/1962 | Schotthoefer |
| 2,001,533 A | 5/1935 | Houston | | 3,078,832 A | 2/1963 | Braine |
| 2,026,705 A | 1/1936 | Pratt | | 3,107,541 A | 10/1963 | Parsus |
| 2,027,891 A | 1/1936 | Weitzel | | 3,126,835 A | 3/1964 | Kline |
| 2,041,319 A | 5/1936 | Blomgren | | 3,169,514 A | 2/1965 | Girodin |
| 2,057,147 A | 10/1936 | Holmes | | 3,170,444 A | 2/1965 | Haddon |
| 2,062,219 A | 11/1936 | Ginn | | 3,202,141 A | 8/1965 | Lovell |
| 2,065,790 A | 12/1936 | Braunwalder | | 3,306,269 A | 2/1967 | Dimmock, Jr. |
| 2,068,038 A | 1/1937 | Prothero et al. | | 3,326,193 A | 6/1967 | Wahimark |
| 2,069,651 A | 2/1937 | Ferris | | 3,333,577 A | 8/1967 | Mongitore |

| Patent No. | Kind | Date | Name | Ref |
|---|---|---|---|---|
| 3,359,864 | A | 12/1967 | Hamlin | |
| 3,385,051 | A | 5/1968 | Kelly | |
| 3,396,709 | A | 8/1968 | Robicheaux | |
| 3,403,668 | A | 10/1968 | Schottler | |
| 3,407,593 | A | 10/1968 | Kelly | |
| 3,408,898 | A | 11/1968 | Hamlin | |
| 3,456,630 | A | 7/1969 | Karlan | |
| 3,570,463 | A | 3/1971 | Nelson | |
| 3,587,538 | A | 6/1971 | Poole | |
| 3,598,094 | A | 8/1971 | Odawara et al. | |
| 3,626,911 | A | 12/1971 | Shaw et al. | |
| 3,654,906 | A | 4/1972 | Airas et al. | |
| 3,687,117 | A | 8/1972 | Panariti | |
| 3,695,237 | A | 10/1972 | Londo | |
| 3,745,887 | A | 7/1973 | Striegl et al. | |
| 3,745,981 | A | 7/1973 | Warner | |
| 3,763,834 | A * | 10/1973 | Geiger et al. | 123/258 |
| 3,774,581 | A * | 11/1973 | Lundy | 123/70 R |
| 3,788,790 | A | 1/1974 | Balevsky et al. | |
| 3,805,749 | A | 4/1974 | Karlan | |
| 3,807,370 | A | 4/1974 | Baugh | |
| 3,828,741 | A | 8/1974 | Bixier et al. | |
| 3,830,208 | A | 8/1974 | Turner | |
| 3,844,258 | A | 10/1974 | Howell | |
| 3,854,284 | A | 12/1974 | Denker | |
| 3,895,614 | A | 7/1975 | Bailey | |
| 3,899,880 | A | 8/1975 | Rohs et al. | |
| 3,902,466 | A | 9/1975 | Gulko | |
| 3,902,468 | A | 9/1975 | Turner | |
| 3,905,338 | A | 9/1975 | Turner | |
| 3,913,534 | A | 10/1975 | Bratten | |
| 3,923,018 | A | 12/1975 | Markowitz | |
| 3,929,107 | A | 12/1975 | Renger et al. | |
| 3,939,809 | A | 2/1976 | Rohs et al. | |
| 3,943,407 | A | 3/1976 | Bolasny | |
| 3,943,895 | A | 3/1976 | Howell | |
| 3,945,359 | A | 3/1976 | Asaga et al. | |
| 3,949,723 | A * | 4/1976 | Beesch | 123/551 |
| 3,968,776 | A | 7/1976 | Rund | |
| 3,970,055 | A | 7/1976 | Long | |
| 3,973,531 | A | 8/1976 | Turner | |
| 3,996,912 | A * | 12/1976 | Dreisin et al. | 123/551 |
| 4,022,167 | A | 5/1977 | Kristiansen et al. | |
| 4,022,168 | A | 5/1977 | Sprague | |
| 4,023,542 | A | 5/1977 | Ango | |
| 4,060,060 | A | 11/1977 | Turner | |
| 4,084,555 | A | 4/1978 | Outlaw | |
| 4,124,003 | A | 11/1978 | Abe et al. | |
| 4,127,096 | A | 11/1978 | Townsend | |
| 4,129,101 | A | 12/1978 | Townsend | |
| 4,138,930 | A | 2/1979 | Searle et al. | |
| 4,149,498 | A | 4/1979 | Ferrell | |
| 4,157,079 | A | 6/1979 | Kristiansen et al. | |
| 4,185,508 | A | 1/1980 | Hardt | |
| 4,195,600 | A | 4/1980 | Shingai et al. | |
| 4,213,427 | A | 7/1980 | Di Stefano | |
| 4,219,001 | A | 8/1980 | Kumagai et al. | |
| 4,250,843 | A | 2/1981 | Chang et al. | |
| RE30,565 | E | 4/1981 | Kristiansen | |
| 4,287,858 | A | 9/1981 | Anzalone | |
| 4,287,862 | A * | 9/1981 | Noguchi et al. | 123/310 |
| 4,363,294 | A | 12/1982 | Searle et al. | |
| 4,366,784 | A | 1/1983 | Paul | |
| 4,418,656 | A | 12/1983 | Stanton | |
| 4,453,508 | A | 6/1984 | Groeger | |
| 4,487,177 | A * | 12/1984 | Ishikawa | 123/253 |
| 4,492,188 | A | 1/1985 | Palmer et al. | |
| 4,502,427 | A | 3/1985 | Brille et al. | |
| 4,510,894 | A | 4/1985 | Williams et al. | |
| 4,520,765 | A | 6/1985 | Gerace | |
| 4,565,165 | A | 1/1986 | Papanicolaou et al. | |
| 4,587,941 | A * | 5/1986 | Mishina et al. | 123/551 |
| 4,592,309 | A | 6/1986 | Williams et al. | |
| 4,610,223 | A | 9/1986 | Karlan | |
| 4,632,081 | A | 12/1986 | Giuliani et al. | |
| 4,635,590 | A | 1/1987 | Gerace | |
| 4,648,358 | A | 3/1987 | Sullivan et al. | |
| 4,691,682 | A * | 9/1987 | Hoppie | 123/551 |
| 4,768,481 | A | 9/1988 | Wood | |
| 4,834,033 | A | 5/1989 | Larsen | |
| 4,867,107 | A | 9/1989 | Sullivan et al. | |
| 4,867,121 | A | 9/1989 | Bivona et al. | |
| 4,915,064 | A | 4/1990 | Mannerstedt et al. | |
| 4,960,082 | A | 10/1990 | Sullivan et al. | |
| 4,974,555 | A | 12/1990 | Hoogenboom et al. | |
| 4,974,556 | A | 12/1990 | Royse | |
| 4,996,953 | A | 3/1991 | Buck | |
| 5,009,198 | A | 4/1991 | Sullivan et al. | |
| 5,010,860 | A * | 4/1991 | Broussard | 123/256 |
| 5,010,869 | A | 4/1991 | Lee | |
| 5,014,653 | A | 5/1991 | Sullivan et al. | |
| 5,016,580 | A | 5/1991 | Gassman | |
| 5,029,558 | A | 7/1991 | Sullivan et al. | |
| 5,070,825 | A | 12/1991 | Morgan | |
| 5,083,532 | A | 1/1992 | Wiesen | |
| 5,103,778 | A | 4/1992 | Usich, Jr. | |
| 5,140,953 | A | 8/1992 | Fogelberg | |
| 5,159,902 | A | 11/1992 | Grimm | |
| 5,209,190 | A | 5/1993 | Paul | |
| 5,218,933 | A | 6/1993 | Ehrlich et al. | |
| 5,228,415 | A | 7/1993 | Williams | |
| 5,322,042 | A | 6/1994 | di Priolo et al. | |
| 5,323,738 | A | 6/1994 | Morse | |
| 5,329,893 | A | 7/1994 | Drangel et al. | |
| 5,351,657 | A | 10/1994 | Buck | |
| 5,375,567 | A | 12/1994 | Lowi, Jr. | |
| 5,437,251 | A | 8/1995 | Anglim et al. | |
| 5,443,043 | A | 8/1995 | Nilsson et al. | |
| 5,452,689 | A | 9/1995 | Karlan | |
| 5,456,220 | A | 10/1995 | Candler | |
| 5,467,757 | A | 11/1995 | Yanagihara et al. | |
| 5,476,072 | A | 12/1995 | Guy | |
| 5,507,253 | A | 4/1996 | Lowi, Jr. | |
| 5,517,953 | A | 5/1996 | Wiesen | |
| 5,535,716 | A | 7/1996 | Sato et al. | |
| 5,551,383 | A | 9/1996 | Novotny | |
| 5,566,578 | A | 10/1996 | Rose | |
| 5,632,255 | A * | 5/1997 | Ferrenberg | 123/543 |
| 5,636,561 | A | 6/1997 | Pecorari et al. | |
| 5,647,308 | A | 7/1997 | Biagini et al. | |
| 5,678,518 | A * | 10/1997 | Grothe et al. | 123/298 |
| 5,704,332 | A | 1/1998 | Motakef | |
| 5,743,220 | A | 4/1998 | Guarner-Lans et al. | |
| 5,749,337 | A | 5/1998 | Palatov | |
| 5,762,039 | A | 6/1998 | Gonzalez | |
| 5,765,512 | A | 6/1998 | Fraser | |
| 5,799,629 | A | 9/1998 | Lowi, Jr. | |
| 5,813,372 | A | 9/1998 | Manthey et al. | |
| 5,823,170 | A * | 10/1998 | Sienicki | 123/551 |
| 5,832,880 | A | 11/1998 | Dickey | |
| 5,875,743 | A | 3/1999 | Dickey | |
| 5,890,462 | A | 4/1999 | Bassett et al. | |
| 5,894,820 | A | 4/1999 | Baeta et al. | |
| 5,904,044 | A | 5/1999 | White | |
| 5,950,580 | A | 9/1999 | Birckbichler | |
| 5,977,716 | A | 11/1999 | Motouchi et al. | |
| 5,992,357 | A | 11/1999 | Tasi et al. | |
| 6,003,480 | A | 12/1999 | Quayle et al. | |
| 6,089,195 | A | 7/2000 | Lowi, Jr. | |
| 6,092,512 | A | 7/2000 | Ma et al. | |
| 6,230,683 | B1 * | 5/2001 | zur Loye et al. | 123/435 |
| 6,260,520 | B1 | 7/2001 | Van Reatherford | |
| 6,276,334 | B1 * | 8/2001 | Flynn et al. | 123/435 |
| 6,340,013 | B1 * | 1/2002 | Britton | 123/258 |
| 6,345,610 | B1 * | 2/2002 | Yang | 123/551 |
| 6,578,533 | B1 * | 6/2003 | Gray, Jr. | 123/78 D |

| | | | |
|---|---|---|---|
| 6,626,650 B1 * | 9/2003 | Kenchington et al. | 417/416 |
| 6,694,944 B2 * | 2/2004 | Agama et al. | 123/259 |
| 6,698,394 B2 | 3/2004 | Thomas | |
| 6,769,420 B1 | 8/2004 | Motouchi et al. | |
| 6,802,706 B2 | 10/2004 | Collesan et al. | |
| 6,941,907 B2 * | 9/2005 | Dixon | 123/78 D |
| 6,986,342 B2 | 1/2006 | Thomas | |
| 7,028,648 B2 * | 4/2006 | Hasegawa et al. | 123/58.8 |
| 2005/0039711 A1 * | 2/2005 | Bryant | 123/90.15 |

FOREIGN PATENT DOCUMENTS

| | | |
|---|---|---|
| DE | 3214516 | 10/1983 |
| DE | 3342108 | 8/1984 |
| DE | 4015867 | 11/1991 |
| EP | 0093822 | 11/1983 |
| EP | 0136565 | 4/1985 |
| FR | 416364 | 10/1910 |
| FR | 433357 | 4/1912 |
| FR | 481697 | 3/1917 |
| FR | 1075110 | 7/1927 |
| FR | 711040 | 9/1931 |
| FR | 2557659 | 7/1985 |
| FR | 2566460 | 12/1985 |
| FR | 2707700 | 1/1995 |
| GB | 113711 | 3/1918 |
| GB | 377877 | 8/1932 |
| GB | 455585 | 10/1936 |
| JP | 5523308 | 2/1980 |
| JP | 580183825 | 10/1983 |
| JP | 2004108225 A * | 4/2004 |
| WO | 9209798 | 6/1992 |
| WO | 9209799 | 6/1992 |
| WO | 9807973 | 2/1998 |
| WO | 9841734 | 9/1998 |
| WO | 0057044 | 9/2000 |

OTHER PUBLICATIONS

"Engine Smoothness", 2000, www.fortunecity.com/silverstone/lancia/58/tech-nical.sub.-- school/engine/smoot. cited by other.

"Recriprotating Combustion Engine", 2001, http://reciprotating.com/default.-htm. cited by other.

"Homogeneous-Charge Compression Ignition Stratified Charge Compression Ignition Engine Laboratory", 2000, http://www.ca.sandia.gov. cited by other.

"SVD--A Unique Engine Concept", Feb. 2000, http://www.saab/com/home/GLOBAL-/en/pressreleases.xml. cited by other.

"Dynamics of the Swash Plate Mechanism" 1984, Proceedings of the 19845 Inter Compressor Engineering Conference. cited by other.

"New Engine Excites Many in Auto Industry", 1998, http://www.detnews.com/19-98/autos/9805/20/052001.htm. cited by other.

Kawabata, Y., Nakagawa K. and Shoji, F., "Operating Characteristics of Natural Gas Fueled Homogeneous Charge Compression Ignition", 1998, Annual Technical Report Digest. cited by other.

"Dyna-Cam Revolutionary Engine Design", 2001, http://www.dynacam.com. cited by other.

Christensen, M., Johansson, B., and Einewall, P., "Homogeneous Charge Compression Ignition (HCCI) using isooctane, ethanol, and Natural Gas. A Comparison with Spark-Ignition Operation", 1997, SAE Paper 972874. cited by other.

Hultqvist, A., Christensen, M., and Johansson, P., "A Study of the Homogeneous Charge Compression Ignition Combustion Process by Chemiliminescence Imaging", 1999, SAE Paper 1999-01-3680. cited by other.

Gray A. and Ryan T., "Homogeneous Charge Compression Ignition (HCCI) of Diesel Fuel", 1997, SAE Paper 971676. cited by other.

Ziph B. and Meijer R., "Variable Stroke Power Control for Stirling Engines", 1981, SAE Paper 810088. cited by other.

Clucas D.M. and Raine J.K., "A New Wobble Drive with Particular Application in a Stirling Engine", 1994, IMechE vol. 208. cited by other.

Kontarakis G., Collings N. and Ma T., "Demonstration of HCCI Using Single-Cylinder, Four-stroke SI Engine with Modified Valve Timing", 2000 SAE 2000-01-2870. cited by other.

Pucher G., Gardener D., Bardon M. and Battista, V., "Alternative Combustion Systems for Piston Engines Involving Homogeneous Charge Compression Ignition Concepts--A Review of Studies Using Methanol, Gasoline, and Diesel Fuel", 1996,http://www.bcresearch.com. cited by other.

Gill G.S. and Freudenstein F., "Minimization of Inertia-Induced Forces in Spherical Four-bar Mechanisms. Part 2: Wobble-Plate Engines", 1983, ASME. cited by other.

Gill, G.S. and Freudenstein F., "Minimization of Intertis-Induced Forces in Spherical Four-bar Mechanisms. Part 1: The General Spherical Four-bar Linkage", 1983, ASME vol. 105/471. cited by other.

Hardenberg H. and Buhl H., "The Mercedes-Benz Om 403 VA--A Standard Production, Compression-Ignition, Direct-Injection Multifuel Engine" 1982, SAE Paper 820028. cited by other.

Hiroshi T. and Masaharu H., "Historical Review of the Wobbleplate and Scroll Type Compressors", 1990, SAE Paper 901737. cited by other.

Li J., Chae J., Lee S. and Jeong J., "Modeling the Effects of Split Injection Scheme on Soot and NOx Emissions of Direct Injection Diesel Engines by a Phenomenological Combustion Model", 1996, SAE Paper 962062. cited by other.

McLanahan J., "Barrel Aircraft Engines: Historical Anomaly or Stymied Innovation", 1998, SAE Paper 985597, cited by other.

Olsson J., Erlandsson O. and Johansson B. "Experiments and Simulation of a Six-Cyliner Homogeneous Charge Compression Ignition (HCCI) Engine", 2000, SAE Paper 2000-01-2867. cited by other.

"Erickson MCC FE-120", 1001, www.ericksonmotors.com/fe-120.htm. cited by other.

Miyagawa K. and Kavukawa H., "Development of the Swash Plate-Type Continuously Variable Displacement Compressor", 1998, SAE Paper 980290. cited by other.

Sadashivappa K., Singaperumal M. and Narayanasamy K., "On the Efficiency of the Axial Piston Motor Considering Piston Form Deviations", 1995, Pergamon 0957-4158 (95) 00074-7. cited by other.

Edge K.A. and Darling j., "The Pumping Dynamics of Swash Plate Piston Pumps", 1989, ASME vol. 111/307. cited by other.

Thieme L. and Allen D., "Testing of a Variable-Stroke Stirling Engine", 1986, 21st Intersociety Energy Conversion Engineering Conference, Paper 869104. cited by other.

Thieme L., "Initial Testing of a Variable STroke Stirling Engine", 1985, U.S. Dept. of Energy, NASA TM-86875. cited by other.

Au M., Girard J. and Hiltner J., "Homogeneous Charge Com;pression Ignition", 2001 http://www.me.berkeley.edu/.about.mctai/hcci.html. cited by other.

Christensen M., Hultqvist A. and Johansson B., "Demonstrating the Multi-Fuel Capability of a Homogeneous Charge Compression Ignition with Variable Compression Ratio", 1999, SAE Paper 1999-01-3679. cited by other.

Christensen M. and Johansson B., "Influence of Mixture Quality on Homogeneous Charge Compression Ignition", 1998, SAE Paper 982454. cited by other.

Christensen M., Johansson B., Amneus P., and Mauss F., "Super-charged Homogeneous Charge Compression Ignition (HCCI)", 1998, SAE Paper 980787. cited by other.

Kraft M., Maigaard P. and Mauss F., "Homogeneous Charge Compression Ignition Engine: A Simulation Study on the Effects of Inhomogeneities", 2000, ASME 2000 Sprint Technical Conference. cited by other.

Kraft M., Maigaard P., Mauss F. and Christensen M., "Investigations of Combustion Emissions in a HCCI Engine Measurements and a New Computational Model 2000 28th International Symposium for Combustion", 4E12. cited by other.

Maricq M., Munoz R., Yang J. and Anderson R., "Sooting Tendencies in an Air Forced Direct Injection Spark-Ignition (DISI) Engine", 2001, SAE Paper 2001-01-0255. cited by other.

Manring N., "Slipper Tipping within an Axial-Piston Swash-Plate Type Hydrostatic Pump", 1998, ASME FPST-vol. 5. cited by other.

Jinqu N., Fukai I. and Kurihara M., "The Development of a Fixed-displacement Single-sided Swash Plate a/c Compressor", 2001, SAE Paper 2001-01-0971. cited by other.

Kaahaaina N., Simon A., Caton P. and Edwards C., "Use of Dynamic Valving to Achieve Residual-Affected Combustion", 2000, SAE Paper 2001-01-0549. cited by other.

Stanglmaier R. and Robert C., "Homogeneous Charge Compression Ignition (HCCI): Benefits, Compromises, and Future Engine Applications", 1999, SAE Paper 1999-01-3682. cited by other.

Thring R., "Homogeneous Charge Compression Ignition (HCCI) Engines", 1989, SAE Paper 892068. cited by other.

Fiveland S., and Assanis D., "A Four-Stroke Homogeneous Charge Compression Ignition Engine Stimulation for Combustion and Performance Studies", 2000, SAE Paper 2001-01-0332. cited by other.

Nishimura T., Umeda T., Tsuta T. and Fujiwara, M., "Dynamic Response Analysis of a Swash Plate Type Hydraulic Piston Pump", 1995, ASME/JSME Pressure Vessels and Piping Conference PVP-vol. 300. cited by other.

Sheiretov T., Glabbeek W. and Cusano C., Simulative Friction and Wear Study of Retrofitted Swash Plate and Rolling Piston Compressors, 1995. cited by other.

Taya T., Kobayashi H., Kawaguchi M. and Inagaki M. "10PC20 Swash Plate Type Variable Displacement Compressor for Automobile Air Conditioners", 1992, SAE Paper 920260. cited by other.

Ryan T. and Callahan T. "Homogeneous Charge Compression Ignition of Diesel Fuel", 1996, SAE Paper 961160. cited by other.

Tsuta T., Iwamoto T. and Umeda T. "Combined Dynamic Response Analysis of a Piston-Slipper System and Libricants in Hydraulic Piston Pump", 1999, ASME PVP vol. 396. cited by other.

Zhang X., Cho. J., Nair S., Manring N., "Damping on the Swash Plate of an Axial Piston Pump 2000", 2000, American Control Conference. cited by other.

"New Saab and Citroen Technology at Geneva", Automotive Engineering Online, SAE International, May 2000. cited by other.

Herling, D., Smith M., Baskaran, S., and Kupe J., "Application of Non-Thermal Plasma Assisted Catalyst Technology for Diesel Emission Reduction", 2000, SAE Paper 2000-01-3088. cited by other.

Law. D., Kemp, D., Allen, J., Kirkpatrick, G., and Copland, T., "Controlled Combustion in an IC-Engine with a Fully Variable Valve Train", 2001, SAE Paper 2000-01-0251. cited by other.

"Advanced Engine Technologies' OX2 Engine Poised as Alternative for Future World Energy Needs", Press Release, Thursday, Feb. 8, 4:34 p.m. Eastern Time (http://biz.yahoo.com/prnews/010208/ca.sub.--advance.sub.--4.html). cited by other.

"Advanced Engine Technologies Unveils New Web Site", Press Release, Monday, Mar. 12, 12:00 p.m. Eastern Time (htyp://biz.yahoo.com/prnews/010- 312/lam013.sub.--2.html). cited by other.

* cited by examiner

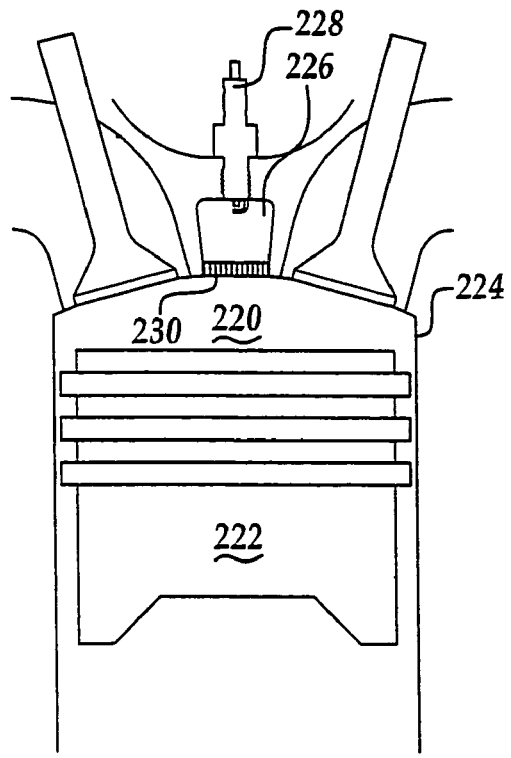
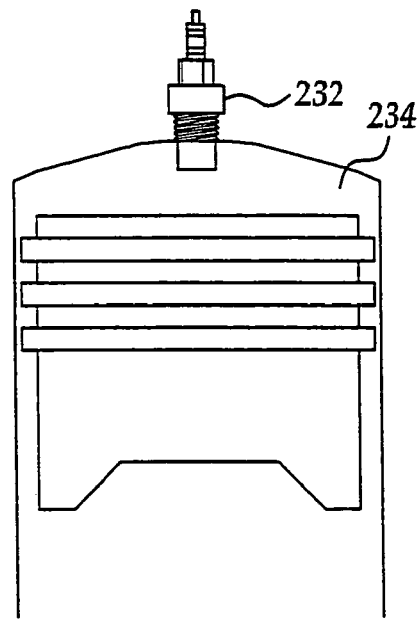
*Figure 13*
*Figure 14*
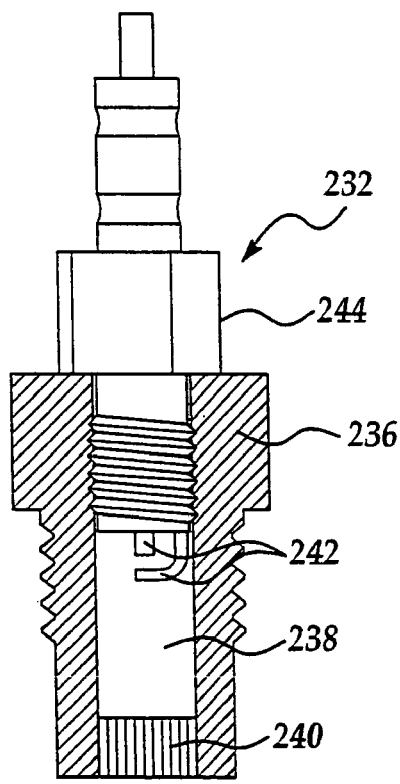
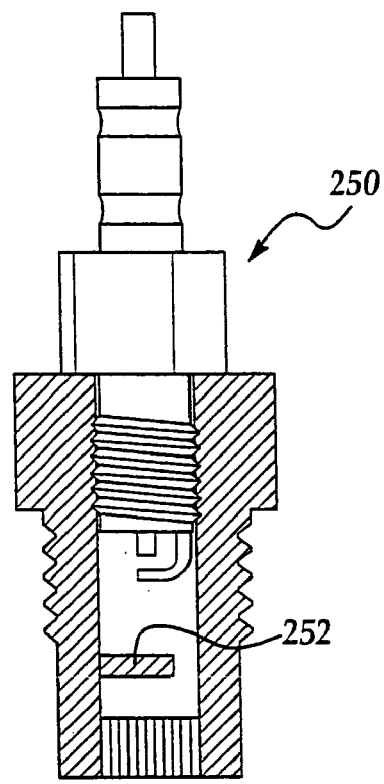
*Figure 15*
*Figure 16*

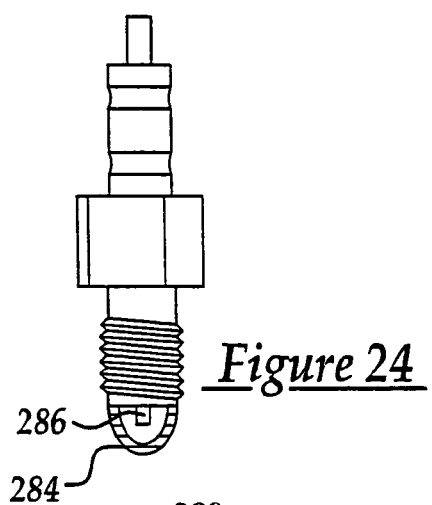
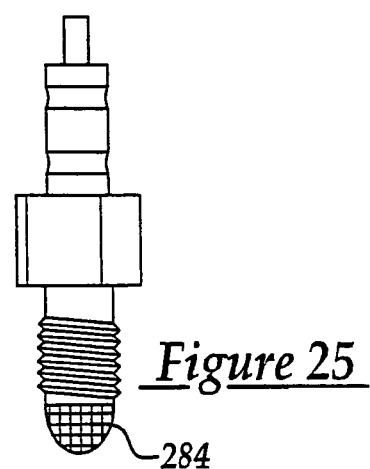
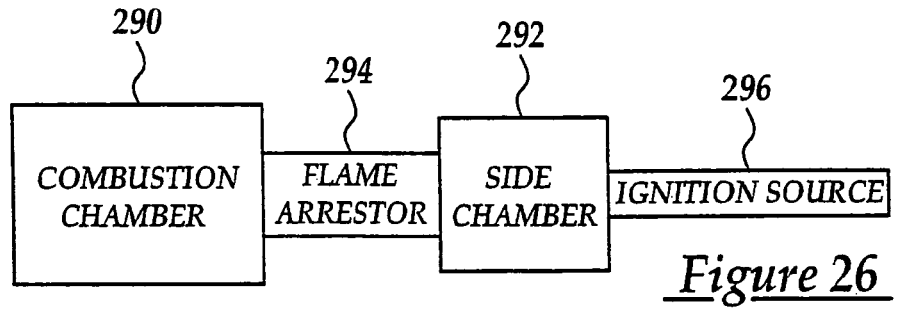
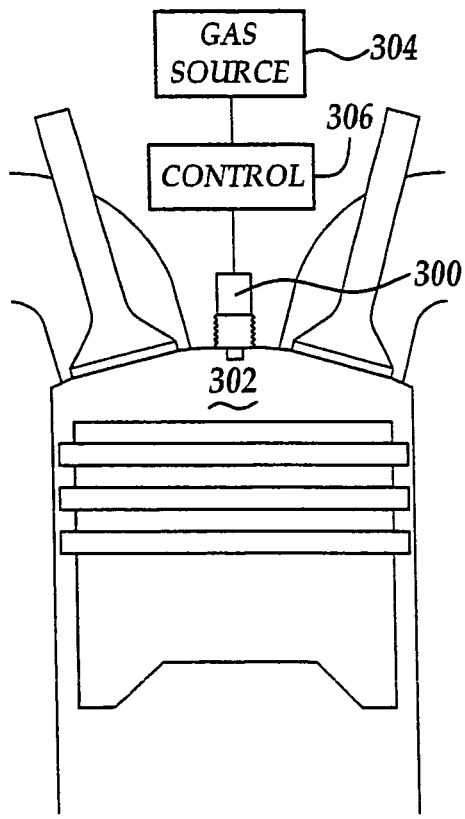
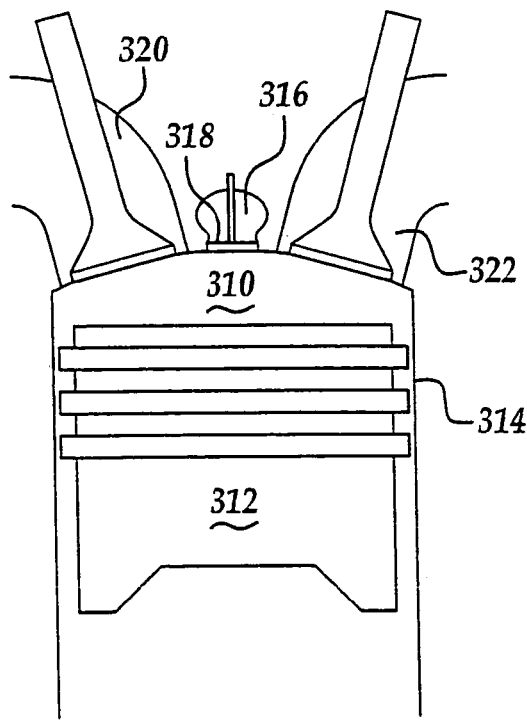

HOMOGENEOUS CHARGE COMPRESSION IGNITION ENGINE WITH COMBUSTION PHASING

REFERENCE TO RELATED APPLICATIONS

This application is a divisional of U.S. patent application Ser. No. 10/791,453, filed Mar. 2, 2004, which is a divisional of U.S. patent application Ser. No. 10/021,192, filed Oct. 30, 2001, now U.S. Pat. No. 6,698,394, which claims priority from U.S. provisional patent application Ser. Nos. 60/244,349, filed Oct. 30, 2000; 60/252,280, filed Nov. 21, 2000; 60/260,256, filed Jan. 8, 2001; 60/261,060, filed Jan. 11, 2001; and 60/267,598, filed Feb. 9, 2001.

U.S. patent application Ser. No. 10/021,192 is also a continuation-in-part of U.S. patent application Ser. No. 09/937,543, filed Sep. 26, 2001, now abandoned, which is a U.S. National Phase of PCT/US00/07743, filed Mar. 22, 2000, which claims priority from U.S. provisional patent application Ser. Nos. 60/125,798, filed Mar. 23, 1999; 60/134,457, filed May 17, 1999; 60/141,166, filed Jun. 25, 1999, and 60/147,584, filed Aug. 6, 1999. The entire content of each application and patent is incorporated herein by reference.

FIELD OF THE INVENTION

The present invention relates generally to internal combustion engines and, more particularly, to homogenous charge compression ignition engines and barrel engines.

BACKGROUND OF THE INVENTION

Internal Combustion Engine Configurations Internal combustion engines have wide applicability in both mobile and stationary power production applications. The most common type of internal combustion engine is a crank driven reciprocating piston engine. This type of engine includes a cylinder with a moveable piston position therein, and defines a combustion chamber between a closed end of the cylinder and the piston. A rod interconnects the piston with an offset journal on a rotateable crankshaft such that rotation of the crankshaft causes the piston to reciprocate upwardly and downwardly within the cylinder. While traditional crank driven engines are the most common, numerous other engine configurations have been proposed and used. One example is the Wankel rotary engine wherein a lobed rotor rotates within a housing to create expanding and contracting combustion chambers.

Another internal combustion engine configuration is shown in FIG. 1. This engine configuration has gone by various names, including barrel engine, axial engine, axial piston or cylinder engine, cam engine, swash ring or plate engine, crank plate engine, cam or wave cam engine, wobble plate engine, and radial or rotary engine, among others. For purposes of the present application, these types of engines will be referred to as barrel engines. However, it should be understood that the term "barrel engine," as used herein, is not limited to the specific configurations illustrated, but instead refers to similar designs as well.

The engine 10 in FIG. 1 is merely representative of the general configuration of the engine referred to herein as a barrel engine. It includes a crankshaft or power shaft 12 with a plurality of cylinders arranged about the power shaft 12, though single cylinder variations are possible. The central axis of each of the cylinders 14 may be generally parallel to the power shaft 12. Alternatively, the axes of the cylinders 14 may be tilted outwardly or inwardly with respect to the power shaft 12. A cam plate or track 16 is preferably connected to the power shaft 12 such that the two rotate in unison. The track 16 surrounds and extends outwardly from the power shaft 12 and has an undulating cam surface 18. As the power shaft 12 is rotated about its longitudinal axis, the cam surface 18 of the track 16 undulates closer to and farther from the cylinders 14. Pistons 20 are moveably positioned in the cylinders 14 and define a combustion chamber 22 between each piston and the upper end of its respective cylinder 14. The pistons 20 are interconnected with the track 16 such that as the track rotates, the pistons are caused to reciprocate within the cylinders 14. In the illustrated embodiment, connecting rods 24 have upper ends interconnected with the pistons 20 and lower ends with rollers 26 that ride on the cam surface of the track 16. Alternatively, pistons in such an engine may be more directly interconnected with the track, such as rollers or slides directly connected to the pistons.

As will be clear to those of skill in this art, as the power shaft 12 rotates and the pistons 20 reciprocate within their respective cylinders, the various strokes of a combustion cycle can be defined. Typically, the cam surface 18 of the track 16 has a generally sinusoidal shape, thereby corresponding to the reciprocal motion typical of a crank driven piston. Also, the track is generally disposed in a plane perpendicular to the power shaft and the cam surface is generally disposed at a constant distance from the axis of the power shaft.

Barrel engines may be either single ended or double ended. In a single ended design, cylinders and pistons are provided in the end of the engine on one side of the track, such as above the track as illustrated in FIG. 1. In double ended designs, cylinders and pistons are provided on both ends of the engine (both above and below the track when positioned as shown in FIG. 1). Another variation includes a track at both ends of the engine and opposed pistons extending towards one another from the two tracks. The tracks typically rotate in unison causing two pistons to reciprocate towards and away from one another within a common cylinder.

Applicant's prior applications, referred to in the Reference to Related Applications, and incorporated herein by reference, discuss various engine designs generally referred to as Inverse Peristaltic Engines. Applicant considers barrel engines to be a variation within the general class of Inverse Peristaltic Engines, as described in these applications. Other variations on Inverse Peristaltic Engines share certain functional attributes with barrel engines as described within the present application. It should be noted that some aspects of the present invention may be used with engine configurations other than the particular configurations illustrated or described.

Another engine design that has some functional and/or structural similarities to barrel engines, as thus far described, is a type of engine often referred to as a wobble plate engine. FIG. 2A illustrates a schematic of a portion of a wobble plate engine 30. In the barrel engine 10, the track 16 is illustrated as having two low points and two high points corresponding to a complete set of four strokes for a combustion engine. In the wobble plate engine, a plate 32 is interconnected with the longitudinal powershaft 34. The plate 32 is generally planar, but is angled with respect to the powershaft 34 such that it has high and low portions. That is, rather than the 32 being perpendicular to the shaft 34, it is tilted somewhat. Pistons 36 and 38 are in mechanical communication with the plate 32, in a manner similar to in FIG. 1. However, because the plate 32 is generally planar instead of being more complexly shaped, such as the track 16, only two strokes are defined within a single rotation of the plate 32. That is, if the shaft 34 is rotated through one complete revolution, each of the pistons 36 and 38 would experience only a single top-dead center and bottom-dead center. With the barrel engine of FIG. 1, on the other hand, a single rotation of the track 12 causes each of the pistons 20 to travel to top-dead center twice and bottom-dead center twice. Designs similar to the engine 30 have been used for wobble plate compressors. In these compressors, the angle of the plate may be adjusted to adjust the compression ratio of the compressor. Typically, such a compressor has spherical rollers interconnecting the pistons with the plate. An engine may be constructed similarly. The design of FIG. 2A and compressor-like variations are considered to be barrel engines, as defined herein.

Referring now to FIG. 2B, another version of an engine 40 is illustrated. In this engine 40 a shorter longitudinal powershaft 42 connects with an angled cam 44, that is generally triangular in cross-section. The powershaft 42 and angled cam 44 rotate in unison. A wobble plate or piston support plate 46 rides on the upper surface of the angled cam 44, but does not rotate therewith. Therefore, as the angled cam 44 rotates, the piston support plate 46 tilts back and forth. Pistons are interconnected with the piston support plate 46 such that movement of the plate 46 causes reciprocal motion of the pistons. This is again considered a type of barrel engine as defined herein. It differs from the two previous designs in that the piston support plate 46 replaces the rollers for communicating movement between the cam 44 and the pistons.

Other versions of barrel engines, as defined herein, include a type of engine called nutating engine. An example is shown in U.S. Pat. No. 5,992,357 which is incorporated in its entirety herein by reference. Another barrel engine design, sometimes referred to as a bent-axis engine, is shown in U.S. Pat. No. 1,293,733 to Duby, which is also incorporated herein in its entirety by reference.

Combustion Strategies for Internal Combustion Engines

A variety of combustion strategies have been proposed and/or tested for internal combustion engines. The most common strategy, referred to herein as spark ignition (SI), is illustrated in FIG. 3. Air and fuel are mixed together prior to being drawn into a combustion chamber. The mixture is compressed in the combustion chamber and a spark is then provided to ignite the compressed mixture. This process is used in most gasoline-fueled internal combustion engines. Spark ignited internal combustion engines include both two stroke and four stroke reciprocating piston designs, as well as some less well known varieties. The air and fuel is typically mixed upstream of the cylinder using a carburetor or fuel injectors. The air and fuel mixture for multiple cylinders may be created at a single point, such as with typical carburetors and throttle body fuel injection systems, or fuel and air may be mixed individually for individual cylinders, such as occurs with port fuel injection. A less common approach is to directly inject fuel into the cylinder prior to or during the compression stroke. Whatever the variation, spark ignition engines are characterized by the fact that combustion is initiated by the introduction of a spark to a compressed air and fuel mixture. Spark ignited engines have the benefit that combustion timing, also referred to as combustion phasing, is easily controlled. Because combustion is initiated by the introduction of a spark, combustion timing can be controlled by controlling spark timing. Spark ignition engines also tend to be relative compact and less expensive than some other types of engines. A drawback to spark ignition engines is lower fuel efficiencies than some other types.

Another well known combustion strategy is the approach used with Diesel engines, illustrated in FIG. 4. In a Diesel, air, without fuel, is drawn into a combustion chamber and compressed. Once the air is partly or completely compressed, fuel, typically Diesel fuel, is injected into the compressed air. The introduction of the fuel into the compressed air, under the appropriate conditions, causes the fuel and air mixture to combust. Variations on the diesel strategy include the introduction of fuel at more than one stage in so called stratified-charge Diesel engines. In a stratified-charge Diesel engine, the air fuel mixture is intentionally manipulated to create areas of richer and leaner fuel concentrations. Often this is accomplished by compressing an initially lean mixture and then adding additional fuel to create localized rich areas and to initiate combustion. Stratified-charge or lean combustion approaches have also been used with spark ignition engines. Combustion phasing is also easily controlled in a diesel engine, since fuel injection timing determines combustion timing. Diesel engines offer improved fuel efficiency in comparison to spark ignited engines, and offer the ability to combust less expensive types of fuels. However, Diesel engines tend to be heavier, more expensive and noisier than spark ignited engines. Also, diesels produce high levels of oxides of nitrogen ($NO_x$) and particulate emissions.

Another combustion strategy, referred to herein as homogenous charge compression ignition (HCCI), is illustrated in FIG. 5. In HCCI, a mixture of air and fuel is drawn into a combustion cylinder. The mixture is then compressed until the mixture autoignites, without the introduction of a spark. Variations on HCCI include injection of fuel directly into the cylinder at some point during the compression stroke so as to promote a substantially premixed charge. The HCCI combustion strategy has been referred to by various names, including controlled auto-ignition combustion (Ford), premixed charged compression ignition (Toyota and VW), active radical combustion (Honda), fluid dynamically controlled combustion (French Petroleum Institute), and active thermo combustion (Nippon Engines).

HCCI offers several benefits over spark ignition and Diesel strategies. First, HCCI offers the potential for significantly increased fuel efficiency. Second, emissions from HCCI are more manageable than for other strategies. HCCI combustion is significantly cooler than conventional combustion and therefore has significantly lower NOx emissions. HCCI also produces less particulate emissions than a diesel engine. Additionally, the absence of locally rich regions found in conventional Diesel engines reduces or eliminates particulate emissions and smoke. The benefits and drawbacks to HCCI, as well as strategies for controlling HCCI, are more extensively discussed in SAE paper no. 1999-01-3682, which is incorporated herein in its entirety by reference.

A drawback to HCCI is that combustion phasing is very difficult to control. The autoignition point of a compressed mixture of air and fuel depends on numerous factors, including the exact makeup of the fuel, the temperature of the mixture, the temperature of the cylinder, the makeup and reactivity of any other components present in the combustion chamber, the shape of the combustion chamber, the operating speed of the engine, the operating load of the engine, and numerous other factors. There has thus far been no practical way to effectively control HCCI combustion in an engine subject to normal transients in load and RPM. Unlike diesel and spark-ignited engines, where the phasing of combustion can be controlled by timing when fuel is injected or when a spark is introduced, HCCI engines lack a direct method of controlling the start of combustion.

Another challenge with HCCI is related to combustion rate. Combustion in HCCI engines occurs at multiple ignition points within the combustion chamber and unlike diesel ignition, in which the rate of combustion is controlled by the mixing rate of the fuel jet and oxidizer, pressure rise in HCCI can occur at an extremely rapid and destructive rate unless very lean air-fuel mixtures are used. The requirement for lean air-fuel mixtures limits the maximum power output of HCCI engines to 50-75% of that of equivalent diesel and Otto cycle engines, placing limitations on the markets in which HCCI engines can be used.

Control Strategies for HCCI

Numerous approaches have been proposed for controlling combustion phasing in an HCCI engine. One approach to controlling the combustion phasing of an HCCI engine is to adjust the compression ratio of the engine. The mixture of the air and fuel will autoignite once it is sufficiently compressed. However, the amount of compression necessary to initiate combustion depends on numerous factors. By varying compression ratio, combustion phasing can be controlled. Higher compression ratios result in earlier combustion and lower compression ratios result in later combustion, or a lack of combustion. Several variable compression ratio engine designs have been proposed, and in some cases, built. These engines suffer from mechanical complexity and increased costs. Additionally, depending on the method used to vary the compression ratio in the engine, changes cannot be made quickly enough to adequately control combustion phasing in an HCCI engine. Also, some designs restrict the placement of valves and create crevice areas in the combustion chamber, thereby leading to lowered efficiency and increased emissions. Such a design is disclosed in SAE paper 1999-01-3679, which is incorporated herein by reference.

Another method for controlling combustion phasing in HCCI engines is to control the temperature of the intake air. As the intake air temperature is increased, with all other conditions held constant, combustion will occur earlier. Reducing the temperature of the intake air delays combustion. Therefore, by controlling the intake air temperature, combustion phasing may be controlled to some extent. Drawbacks to this approach include reductions in volumetric efficiency as intake air temperature is increased and complications related to the provision of heated intake air. Precise control of the intake air temperature at the combustion chamber is also difficult, and the range of adjustment available with this approach is quite limited.

Fuel blending is an additional method for controlling HCCI combustion phasing. Different types of fuels autoignite under different conditions. Therefore, by blending two or more fuels with different propensities to autoignite, combustion phasing can be adjusted. This approach is typically limited to stationary applications. Obvious drawbacks include complications associated with redundant fuel systems and the need for an infrastructure to support distribution of disparate and exotic fuels.

SAE Paper 2000-01-0251 (incorporated herein by reference) discusses the use of residual exhaust gas as a method of controlling HCCI combustion phasing. As the amount of exhaust gas introduced to the combustion chamber is increased, combustion occurs earlier. Drawbacks to this approach included a limited range of control, reduced power and efficiency at high residual levels, and the requirement for high residual levels under certain conditions.

U.S. Pat. Nos. 5,832,880 and 5,875,743 to Dickey propose the use of water injection to control combustion phasing. Water is introduced either in the intake manifold or directly into the combustion chamber. The introduction of water into the combustible mixture delays the onset of combustion. This approach requires the provision of a very controllable water injection system and there is some concern that the injection of water into the combustible mixture may increase engine wear. Also, this approach has not provided adequate control according to researchers in the field.

Yet another approach to HCCI combustion phasing control is proposed in U.S. Pat. No. 6,260,520 to Van Reatherford (incorporated herein by reference). This patent proposes providing a secondary compression device designed to provide additional compression of the mixture in the combustion chamber. In this patent, a secondary boost piston is provided in the cylinder head such that movement of the piston increases and decreases the combustion chamber volume. In operation, the mixture of air and fuel is first compressed by the primary piston. Then, the secondary piston is moved to further increase the compression in the combustion chamber until the mixture autoignites. The timing of the movement of the secondary piston controls the onset of combustion, thereby allowing control of combustion phasing. This design is mechanically complex and increases the crevice volume in the combustion chamber.

Variable valve timing has also been proposed as a method of controlling combustion phasing. By controlling the valve timing of an engine, the effective compression ratio can be somewhat modified.

Despite substantial effort by numerous parties, no control strategy has proven particularly effective at regulating HCCI combustion phasing. This is particularly true where the HCCI engine would experience fast changes in speed and load.

SUMMARY OF THE INVENTION

The present invention improves on the prior art with numerous aspects applicable to barrel engines and/or homogenous charge compression ignition engines, as well as aspects with wider applicability. In one embodiment of the present invention, a homogenous charge compression ignition barrel engine includes an engine housing with a first and second end. An elongated power shaft is longitudinally disposed in the engine housing and defines a longitudinal axis of the engine. A plurality of cylinders surround the longitudinal axis with each cylinder having a closed end and an open end. Each cylinder has a central axis. The open ends of the cylinders are each generally directed toward the first end of the housing. An intake system is operable to introduce a combustible mixture of air and fuel into each of the cylinders. A track is disposed between the first end of the housing and the open ends of the cylinders such that a portion of the track is disposed generally in alignment with the central axis of each of the cylinders. The track has a cam surface that longitudinally undulates with respect to the open ends of the cylinders. A portion of the cam surface is disposed generally in alignment with the central axis of each of the cylinders. The track and the cylinders are rotatable with respect to each other such that the undulating cam surface moves with respect to the open ends of the cylinders. A piston is moveably disposed in each of the cylinders such that a combustion chamber is defined between the piston and the closed end of the cylinder. Each piston is mechanical communication with the cam surface of the track such that as the cylinders and the track move with respect to each other, the pistons reciprocate within the cylinders. Each cylinder is operable to compress a combustible mixture until the mixture auto ignites, without the introduction of a spark.

The homogenous charge compression ignition barrel engine may also include a variable compression ratio device operable to adjust the longitudinal position of the track with respect to the open ends of the cylinders, such that the compression ratio of the engine is adjusted. In some embodiments, the central axis of the cylinders are parallel to the longitudinal axis of the engine. The track may be disposed generally in a plane that is perpendicular to the longitudinal axis of the engine with the cam surface disposed at a generally constant distance from the longitudinal axis of the engine.

In one version of the engine, the track is in mechanical communication with the power shaft such that they rotate in unison. In an alternative version, the track is in mechanical communication with the engine housing such that the track and the engine housing do not rotate with respect to each other. In this embodiment, the cylinders and the power shaft are in mechanical communication such that the cylinders and power shaft rotate in unison with respect to the engine housing.

In some embodiments of the present invention, the undulating cam surface defines a generally sinusoidal shape. In other embodiments, the undulating cam surface defines a non-sinusoidal shape. In non-sinusoidal shape versions of the cam surface, the cam surface may define at least one top dead center position, with the top dead center position being linearly shorter than if the cam surface defined a sinusoidal shape. Alternatively, the non-sinusoidal cam surface defines at least one compression stroke and one expansion stroke, with the compression stroke being slower and the expansion stroke being faster than if the cam surface defined a sinusoidal shape.

In some embodiments of the present invention, the intake system includes intake and exhaust valves and includes a variable valve timing system that allows the opening and/or closing time and/or lift of the valves to be adjustably controlled.

In a double-ended version of the present invention, a second set of cylinders is provided between the track and the first end of the engine. Moveable pistons are disposed in the second set of cylinders and are also in mechanical communication with the track such that they reciprocate within the second set of cylinders. The second set of cylinders may be used as combustion cylinders or as part of a supercharger for compressing air for the intake system for the other cylinders.

The present invention also provides for a method of converting fuel and air into rotational energy. According to the method, a homogenous charge compression ignition barrel engine, as described above, is provided and the track is rotated so as to position one of the pistons in its upper position. The track is then rotated to move the piston between an upper position and a lower position and a combustible mixture of air and fuel is introduced into the chamber. The track is then rotated to move the piston upwardly and to compress the mixture. Compression continues until the mixture autoignites without the introduction of a spark, such that the mixture combusts. The combustion causes the piston to move downwardly, thereby causing the track to rotate.

As mentioned previously, the homogenous charge compression ignition barrel engine according to the present invention may include a variable compression ratio device. In these embodiments, the invention includes a method of adjusting the compression ratio in order to establish and/or maintain autoignition. A method is also provided for adjusting the compression ratio so as to generally avoid preignition.

According to further aspects of the present invention, a corona discharge device may be used to introduce radicals and ions into the combustion chamber of an engine so as to alter the mixture reactivity of the combustible mixture in the combustion chamber. This in turn alters the combustion phasing of the engine. The corona discharge device preferably is disposed in the intake system of the engine, but may be alternatively positioned in the combustion chamber. The present invention includes a method of using the corona discharge device to adjust the mixture reactivity. The corona discharge device may be used in a homogenous charge compression ignition barrel engine, as described above. The corona discharge device may also be used as part of a method of controlling a homogenous charge compression ignition engine, by adjusting the mixture reactivity so as to adjust combustion phasing.

Further aspects of the present invention include a homogenous charge compression ignition barrel engine, as described above, further including a rapid compression device operable to rapidly increase the compression level in one of the combustion chambers after the piston has at least partially compressed the mixture, and to cause the combustible mixture to autoignite without the introduction of a spark.

The present invention is also directed to various novel rapid compression devices. In one embodiment, the rapid compression device is designed to introduce a charge of hot gas into a combustion chamber and internal combustion engine. The rapid compression device includes a body with a chamber defined therein with an opening communicating with a chamber. An ignition device is operable to ignite the combustible mixture in the secondary chamber, and a gas permeable spark arrestor is disposed in the opening of the chamber such that an ignited combustible mixture in the chamber is extinguished as the mixture is forced through the arrestor. In some embodiments, an igniter is not required in the chamber, with the combustible mixture in the chamber instead being ignited through autoignition by compression. A rapid compression device as just described may be used with a homogenous charge compression ignition engine, or may have other applications. The present invention includes a method of using the above described rapid compression device to provide rapid compression in an internal combustion engine.

An alternative embodiment of a rapid compression method includes the steps of providing an internal combustion engine with a combustion chamber and introducing a mixture of air and fuel into the combustion chamber. The mixture is then compressed and combusted to create a pressurized gaseous combustion product. A portion of the pressurized gaseous combustion product is then captured and substantially all of the remainder of the gaseous combustion produce is exhausted from the combustion chamber. A fresh mixture of air and fuel is then introduced into the combustion chamber and compressed. The held portion of the pressurized gaseous combustion product is then released into the combustion chamber to rapidly raise the compression level.

The present invention further provides for methods of evening out cylinder-to-cylinder combustion phasing variations in an HCCI engine. In one approach, a first corona discharge device is selectively operable to introduce ions and free radicals into the combustible mixture in a first cylinder and a second corona discharge device is selectively operable to introduce ions and free radicals into the combustible mixture for a second cylinder. A controller controls the first and second corona discharge devices to selectively adjust the relative combustion phasing of the first and second cylinders. Alternatively, first and second water injectors may be provided for selectively introducing water to the first and second cylinders, respectively. Once again, a controller controls the first and second water injectors so as to selectively adjust the relative combustion phasing. As another alternative, the temperature of individual cylinders may be separately controlled so as to adjust relative combustion phasing. The same may be done by individually adjusting air-fuel ratios or intake air temperature or exhaust gas recirculation on a cylinder-by-cylinder basis in order to adjust relative combustion phasing.

BRIEF DESCRIPTION OF THE DRAWINGS

FIG. 13 is a schematic representation of a cylinder and piston with a secondary chamber separated from the main combustion chamber by a spark arrestor;

FIG. 14 is a schematic representation of a cylinder and piston with a spark-ignited rapid compression device disposed in the upper end of the cylinder;

FIG. 15 is a cross-sectional view of a version of a spark-ignited rapid compression device according to the present invention;

FIG. 16 is a cross-sectional view of a modified version of a spark-ignited rapid compression device according to the present invention;

FIG. 24 is a side elevational view of a modified spark plug with the ground electrode replaced by a spark arrestor, with the spark arrestor shown in cross-section;

FIG. 25 is a side elevational view of the modified spark plug of FIG. 24;

FIG. 26 is a block diagram showing the general configuration of a spark-ignited rapid compression device according to the present invention;

FIG. 27 is a schematic representation of a cylinder and piston with a gas injection system for use as a rapid compression device;

FIG. 28 is a schematic representation of a cylinder and piston with a secondary chamber separated from the main combustion chamber by an auxiliary valve;

DETAILED DESCRIPTION OF THE PREFERRED EMBODIMENTS

HCCI Barrel Engine

Figure 1:
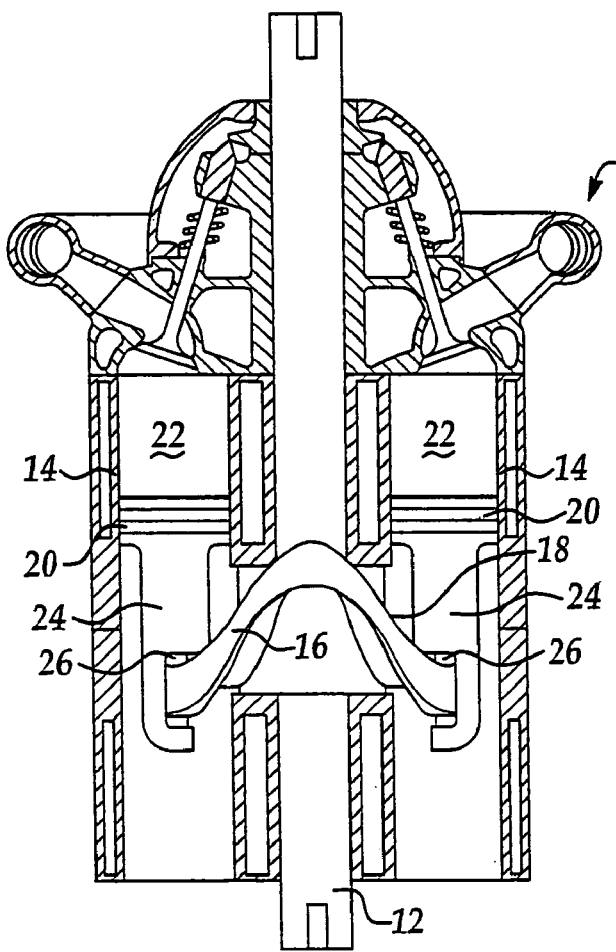
FIG. 1 is a front cross-sectional view of a generalized embodiment of an internal combustion engine referred to herein as a barrel engine.
Figure 2A:
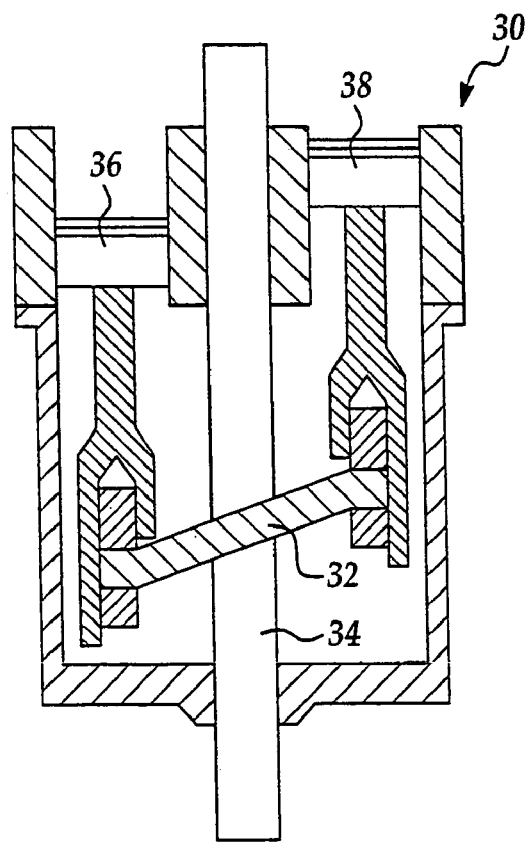
FIG. 2A is a schematic view of a generalized embodiment of an internal combustion engine referred to herein as a wobble plate engine.
Figure 2B:
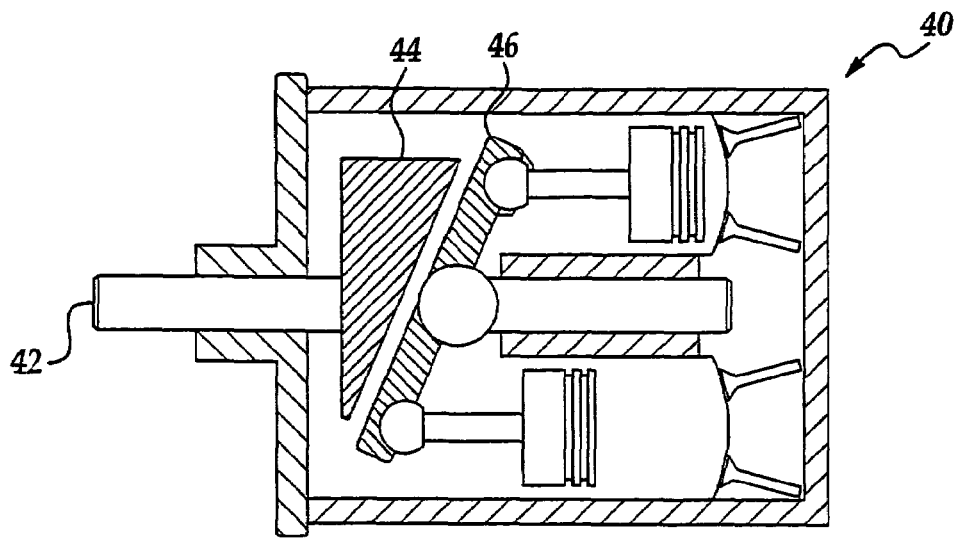
FIG. 2B is a cross-sectional view of another version of the engine defined herein as a barrel engine.
Figure 3:
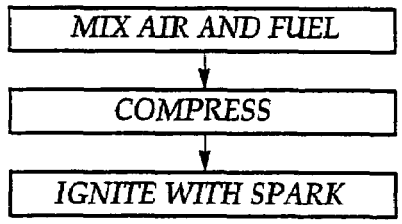
FIG. 3 is a block diagram showing steps that occur in a spark ignition engine.
Figure 4:
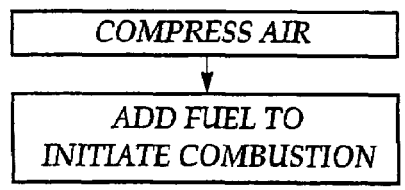
FIG. 4 is a block diagram showing steps that occur in a diesel engine.
Figure 5:
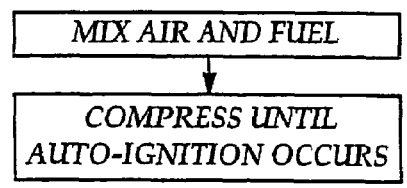
FIG. 5 is a block diagram showing steps that occur in a homogenous charged compression ignition (HCCI) engine.

The present invention is directed to improvements in the class of internal combustion engines referred to herein as barrel engines and to improvements in homogenous charge compression ignition (HCCI) engines, either in combination or separately. In addition, various aspects of the present invention are applicable to engine configurations other than barrel engines and to compression strategies other than HCCI. As discussed in the Background of the Invention, a barrel engine is a type of internal combustion engine that does not include a traditional crankshaft to reciprocate pistons in cylinders. Instead, in a barrel engine, one or more pistons usually mechanically communicate with a track or plate that has a cam surface that undulates towards and away from the cylinders as the engine turns. The mechanical communication between the pistons and the cam surface causes the pistons to reciprocate in their cylinders as the track or plate rotates with respect to the cylinders.

Referring again to FIG. 1, a generalized configuration of a barrel engine is generally shown at 10. A generally vertical power shaft 12 is surrounded by multiple cylinders 22, though a single cylinder version is possible. A track 16 is attached to the power shaft 12 and has a generally sinusoidal cam surface 18. The pistons 20 mechanically communicate with this cam surface 18 via connecting rods, which may be integrally formed with the pistons 20. It should be noted that directional terms used herein such as vertical, horizontal, above, below, and aside are for convenience purposes and are not limiting on the actual configuration or orientation of various components.

According to a first aspect of the present invention, an improved HCCI engine may be provided using a barrel engine configuration. As will be further appreciated with reference to the remainder of the specification, a barrel engine design provides significant benefits, especially for use with an HCCI combustion strategy. In a HCCI barrel engine, a combustable mixture of air and fuel is preferably mixed in the intake system of the engine. Alternatively, fuel may be injected directly into the combustion chamber, preferably early in the compression stroke. An intake valve, or other means for controlling communication with a combustion chamber, opens during the intake stroke for a particular cylinder. During the intake stroke, the piston 20 travels downwardly in the cylinder 14, thereby expanding the combustion chamber 22 and drawing in air or a mixture of air and fuel. In order to move the piston downwardly, the track 16 rotates such that the cam surface 18 of the track undulates downwardly and away from the upper end of the cylinder 14. The intake valve is then closed and the compression stroke begins. During the compression stroke, the piston 20 is urged upwardly in the cylinder 14 as the track 16 continues to rotate and the cam surface 18 undulates towards the cylinder 14. For HCCI, the combustable mixture is compressed until it autoignites. At autoignition, the combustable mixture expands dramatically creating a large downward force on the piston 20. If the combustion is properly phased, the cam surface 18 of the track 16 is at or near top-dead center (TDC), the point at which the cam surface 18 is closest to the cylinder and the piston at its uppermost point for that stroke. The piston is then urged downwardly causing the track to be urged to rotate, thereby driving the powershaft 12. This continues until the piston reaches bottom-dead center (BDC), the point at which the piston 20 is farthest from the top of the cylinder 14 and the cam surface 18 is at its farthest point from the cylinder 14 for that stroke. An exhaust valve, or other device controlling release of combustion product from the combustion chamber 22, is then opened and the combustion products begin to exit the combustion chamber 22. At the same time, the piston 20 begins to move upwardly as the track 16 continues to rotate and the cam surface 18 undulates towards the cylinder 14. The exhaust valve remains open for a period of time to allow the piston to squeeze the combustion products out of the combustion chamber 22. As the piston 20 again reaches top-dead center, the exhaust valve is closed and the intake valve is opened to allow a fresh combustable mixture of air and fuel to be drawn into the combustion chamber 22 as the piston 20 again begins its downward motion. The process is repeated as the engine runs. As is known to those of skill in the engine art, valve opening and closing events may not occur precisely at top-dead center and bottom-dead center, but may instead be phased ahead or after these events, and opening and closing events may overlap with one another. The timing of valve events as discussed above is simplified for ease of description.

In FIG. 1, it can be seen that two cylinders 14 are arranged on opposite sides of the powershaft 12. The shape of the track 16 is such that the pistons 20 and the cylinders 14 travel in unison. That is, the track 16 has a generally sinusoidal shape with two top-dead centers and two bottom-dead centers per rotation. Additional cylinders may be provided at other positions about the powershaft and may be out of phase with the two illustrated cylinders. Also, the track 16 may have other shapes than illustrated in FIG. 1, such as with the illustrated wobble blade engine wherein the plate only has a single top-dead center and a single bottom-dead center per rotation. In some designs, especially for engines with more cylinders, the track may have 3 or more top-dead centers and bottom-dead centers. These other designs are considered to be barrel engines for purposes of the present invention, and the wobble plate or other device is considered to be a track with a cam surface for moving the pistons. The cam surface 18 may be an upper surface, a lower surface, or other arrangement for allows for urging the pistons up and down. For example, the track 16 could have a circumferential groove which is engaged by the connecting rods and pistons. This would also be considered to be a cam surface.

Alternative versions of barrel engines include double-ended designs and opposed piston designs, such as described in the present invention. According to the present invention, any of these versions of barrel engines may be used with an HCCI combustion strategy. For example, an additional set of cylinders may be provided on the other end of the engine from where the illustrated set of cylinders is provided. A second set of pistons may be moveably disposed in these cylinders and in mechanical communication with the track.

According to the present invention, a generator may be integrated into a barrel engine as described in Applicant's incorporated priority documents. A "rotor" is formed on the rotatable part of the barrel engine and the "stator" is formed on the stationary part. This allows for a compact package.

Barrel Engine with Variable Compression Ratio Device

Figure 6:
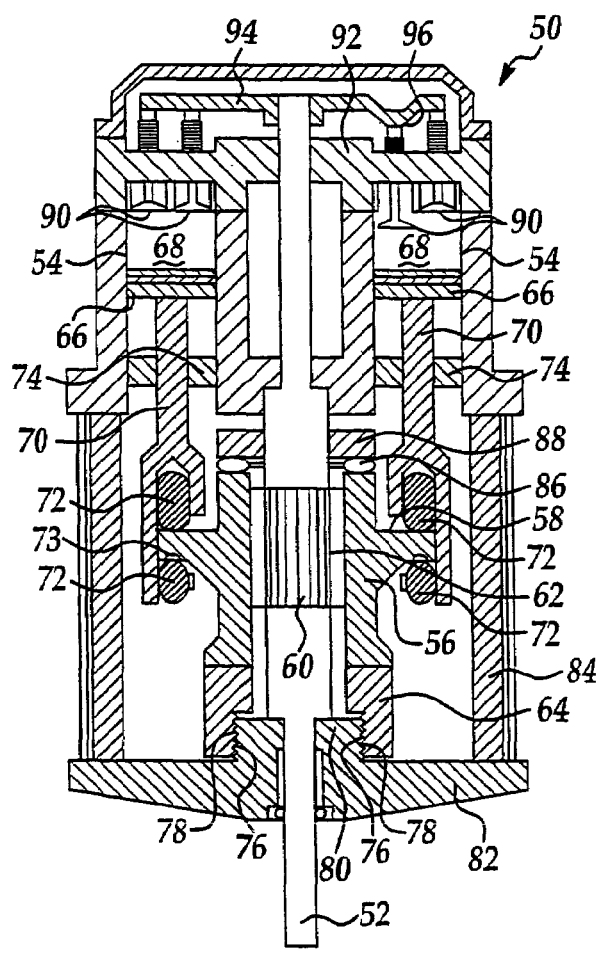
FIG. 6 is a cross-sectional view of one embodiment of a variable compression ratio barrel engine according to the present invention.

Referring now to FIG. 6, an improved barrel engine according to the present invention is generally shown at 50. The barrel engine 50 includes a variable compression ratio device operable to vary the distance between the track 56 and the cylinders 54. The barrel engine 50 includes a longitudinal powershaft 52 that is positioned vertically in the illustration. A pair of cylinders 54 are arranged on opposite sides of the powershaft 52, although single cylinder and a wide range of multi cylinder engines may be constructed according to the present invention. As illustrated, the cylinders 54 are generally parallel to one another and parallel to the longitudinal powershaft 52. Alternatively, the cylinders 54 may be tilted inwardly or outwardly with respect to the shaft 52. A track 56 is positioned about the powershaft 52 and has a cam surface 58 that longitudinally undulates with respect to the cylinders 54. The term cylinder, as defined herein refers to shapes other than a geometric cylinder. For example, a combustion "cylinder", as defined herein, may have a shape that is not a pure geometric cylinder. The term combustion cylinder may also apply to internal combustion chambers generally, including non-traditional designs such as used in rotary engines. In these cases, the term piston is likewise defined broadly to be a compressive device used with the "cylinder" to form a combustion chamber.

Unlike the barrel engine in FIG. 1, the track 56 is not rigidly interconnected with the shaft 52. Instead, the track 56 in the engine 50 is longitudinally movable with respect to the shaft 52. However, the shaft 52 and track 58 are engaged with one another such that they rotate in unison. In the illustrated embodiment, the powershaft 52 has longitudinal splines 60 defined therein which are engaged by corresponding longitudinal teeth or splines 62 defined in an inner sleeve portion of the track 56 where it meets with the shaft 52. Other approaches to rotationally interconnecting the powershaft 52 and the track 56 will be apparent to those of skill in the art. The interlocking splines 60 and 62 allow the track 56 to move longitudinally with respect to the shaft 52 to allow for variable compression ratios while the track 56 and shaft 52 still rotate in unison. A thrust bearing 64 longitudinally supports the track 56 with the track 56 rotating with respect to the lower part of the thrust bearing 64.

Pistons 66 are positioned in their respective cylinders 54 and define combustion chambers 68 between the upper surface of the piston 66 and the closed upper end of the cylinders 54. The pistons 66 mechanically communicate with the cam surface 58 of the track 56 such that as the track 56 rotates, the pistons 66 reciprocate in their respective cylinders 54. In the illustrated embodiment, the pistons 66 have connecting rods 70 that extend downwardly and have rollers 72, which ride on the upper and lower surfaces of the plate 56. Alternatively, the pistons 66 may be shaped and positioned such that the rollers form part of the piston. As further alternatives, the rollers 72 may be replaced with slides or other designs that allow movement between the piston and the track. The lower wheel in each set of wheels may be sized differently than the upper wheel and may be back-set or not placed directly underneath the upper wheel. One or both the wheels may also ride in a groove, such as shown at 73. These variations may help to prevent the piston from rotating and allow the track 56 to be thicker where needed. As will be clear to those of skill in the art, the pistons 66 and rod 70 preferably move axially within the cylinders 54 without tilting side-to-side or front-to-back. In the illustrated embodiment, rod guides 74 are shown which help to retain the rod 70 in the proper orientation.

In order to provide the barrel engine 50 with variable compression ratio capabilities, the thrust bearing 64 is longitudinally movable with respect to the cylinders 54. This may be accomplished in a variety of ways. In the illustrated embodiment, the thrust bearing 64 has a threaded inner diameter 76 that mates with a threaded outer diameter 78 of a hub 80 formed as part of the bottom plate 82 of the engine 50. The plate 82 is rigidly interconnected with the cylinders and head of the engine by the engine case 84. By rotating the thrust bearing 64 with respect to the hub 80, the contact surface between the thrust bearing 64 and the track 56 is moved longitudinally. This directly varies the compression ratio of the engine. It also functions as a continually variable compression ratio unit since the compression ratio may be continuously varied by rotating the thrust bearing 64. The thrust bearing 64 may be rotated with respect to the plate 82 in any of a variety of ways, as will be clear to those of skill in the art. A means is also provided for holding the track 56 in contact with the thrust bearing 64, since under certain conditions, the inertial forces of the engine may attempt to lift the track 56 out of contact with the bearing 64. A stop plate 86 may be provided above the track 56 and interconnected with the powershaft 52. A bushing 88 may be provided between the stop plate 86 and the track 56. Together, the stop plate 86 and bushing 88 exert a downward force on the track 56 to maintain its contact with the bearing 64. As an alternative, a second variable compression ratio device may be positioned above the track so as to hold it down. The two variable compression ratio devices may then be adjusted in unison to adjust and secure the track in position.

The ability to continuously vary compression ratio provides significant benefits in an internal combustion engine. In addition, the design according to the present invention is very simple and effective. The use of a continuously variable compression ratio device in internal combustion engines will be discussed in more detail hereinbelow.

During operation of the engine 50, it is necessary to control the flow of gases into and out of the combustion chamber 68. This may be accomplished using any of a variety of known valve systems either previously known for barrel engines or adapted from other types of internal combustion engines. Also, port designs may be used. In the embodiment illustrated in FIG. 6, valves 90 are provided in the head 92 for allowing the flow of intake and exhaust gases into and out of the combustion chambers 68. According to the present invention, the upper end of the powershaft 52 may extend into the head 92 and have a valve actuation plate 94 connected thereto. The valve actuation plate 94 extends radially outwardly from the shaft 52 to a position above the upper ends of the valves 90. By contouring the valve actuation plate 94, the plate can selectively cause the opening and closing of the valves 90. The plate 94 is shown as generally flat with a downwardly extending bump 96 pushing one of the valves 90 open.

Numerous modifications may be made to the barrel engine 50 illustrated in FIG. 6 without departing from the scope or teaching of the present invention. As a first example, the track 56 may be rigidly interconnected with the shaft 52. The variable compression ratio device, such as movable thrust bearing 64, may then urge both the powershaft 52 and plate 56 toward the cylinders 54 to adjust the compression ratio. Obviously, certain modifications are then required to powershaft 52. For example, if the valve actuation plate 94 is used, compensation must be made for changes in the position of the powershaft 52. As one example, an upper powershaft may be interconnected with a lower powershaft with a splined interconnection such that the upper shaft does not change longitudinal position, but the upper and lower shafts rotate in unison.

As another variation on the design of FIG. 6, a double-ended barrel engine may be provided. In a double-ended design, cylinders are provided at the other end of the engine as well. In the orientation shown in FIG. 6, the bottom plate 82 of the engine 50 would be replaced with cylinders and a head similar to cylinders 54 and head 92. The pistons 66 may then include downwardly extending portions that define pistons in the lower cylinders as well as the upper cylinders. That is, pistons may be provided in both the upper and lower cylinders with the pistons being interconnected with one another either directly or via a connecting rod. An example is shown in U.S. Pat. No. 5,749,337 to Palatov, which is incorporated herein by reference. A benefit to the double-ended design is that the pistons cooperate to avoid non-axial movement.

Figure 7:
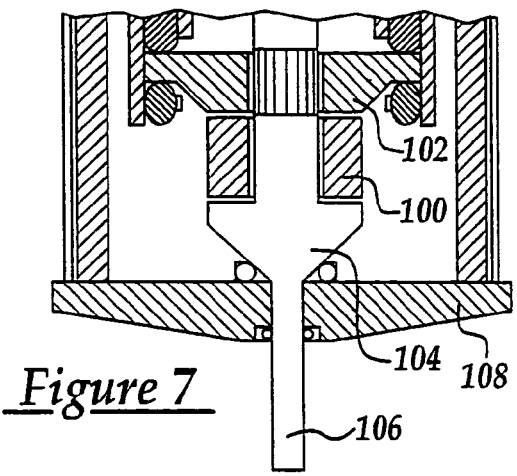
FIG. 7 is a cross-sectional view of a portion of a barrel engine with a second embodiment of a variable compression ratio device according to the present invention.

Referring now to FIG. 7, an alternative variable compression ratio device is illustrated. In this embodiment, an adjustable thickness collar 100 is positioned between the track 102 and a flange 104 on the powershaft 106. By adjusting the thickness of the collar 100, the position of the track 102 relative to the cylinders (not shown) may be adjusted, thereby adjusting the compression ratio of the engine. The adjustable thickness collar 100 may be hydraulically adjusted, similar to a hydraulic lifter, and adjusted via oil pressure fed through the powershaft 106. Alternatively, a mechanical design such as interacting bevel plates or wedges may be used. Again, some type of retainer, or a second adjustable device, may be provided for maintaining the track 102 in contact with the collar 100 and flange 104. As an alternative, the adjustable thickness collar 100 may extend between the bottom plate 108 of the engine and the track 102, similar to the design of FIG. 6. As yet another alternative, the adjustable thickness collar may be positioned between a flange on the powershaft 106 and the bottom plate 108 or other portion of the engine, with the track 102 rigidly connected to the shaft 106. Adjusting the thickness of the collar then moves the position of the shaft and track together. In some of these embodiments, the adjustable thickness collar may include a thrust bearing as well.

Figure 8:
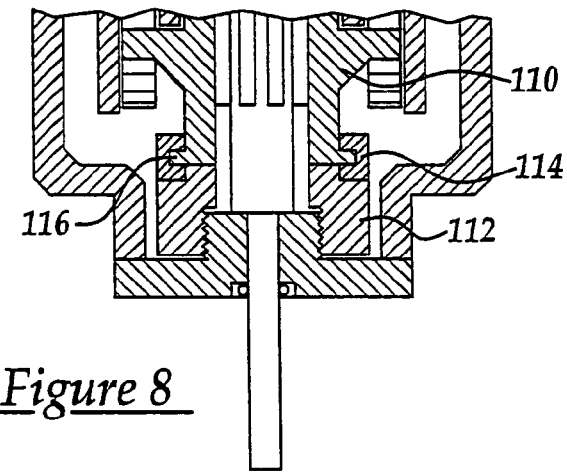
FIG. 8 is a cross-sectional view of a portion of a barrel engine with a third embodiment of a variable compression device according to the present invention.

Referring now to FIG. 8, an alternative approach to maintaining a track 110 in contact with a thrust bearing 112 is illustrated. A retention collar 114 engages a flange 116 on the lower end of the track 110 so as to maintain the track 110 in contact with the thrust bearing 112. A similar approach may be used with the adjustable thickness collar shown in FIG. 7, as well as all alternatives discussed. It should be noted that various aspects of this and other described embodiments of barrel engines may be utilized in different combinations than illustrated. Also, as is known to those of skill in the art, various variable displacement compressor designs have been proposed in the prior art. Some of these designs may be adapted to perform as variable compression engines, for use with the present invention.

Figure 9:
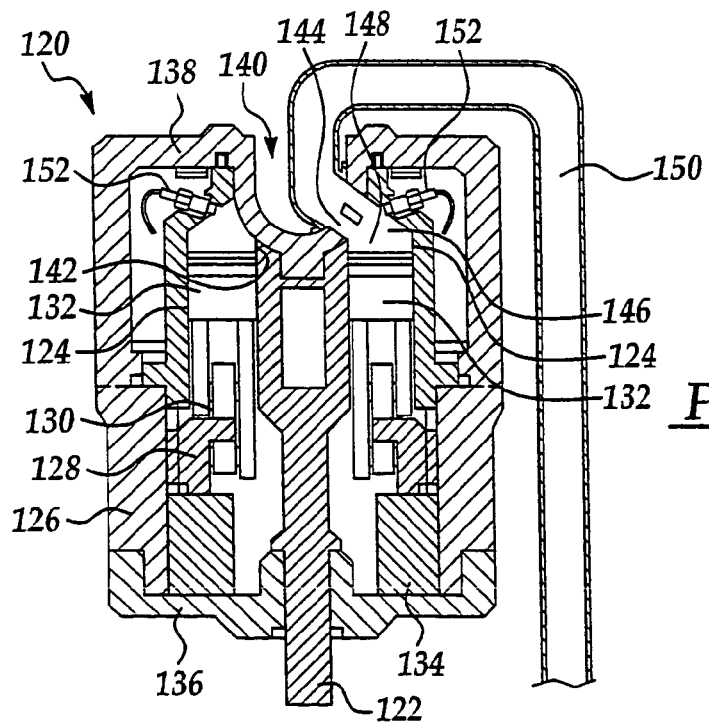
FIG. 9 is a cross-sectional view of another embodiment of a barrel engine with a variable compression device.

Referring now to FIG. 9, an alternative embodiment of a barrel engine according to the present invention is generally shown at 120. This barrel engine 120 differs from previous embodiments in several ways. A longitudinal powershaft 122 is again provided, but the powershaft does not rotate with respect to the cylinders 124. Instead, the power shaft 122 is interconnected with the cylinders 124 to provide a rotatable cylinder assembly. An engine housing 126 surrounds the powershaft 122 and cylinders 124. A track 128 extends inwardly from the case 126 and defines a cam surface 130 that longitudinally undulates with respect to the cylinders 124. The track 128 is preferably longitudinally movable with respect to the case 126, but is interconnected with the case such that the case 126 and track 128 both remain stationary. Splines, teeth, or other approaches may be used to allow longitudinal movement without relative rotational movement. A variable compression ratio device 134 is disposed between the bottom plate 136 of the case 126 and the track 128 such that the device 134 is operable to vary the distance between the track 128 and the bottom plate 136. This may alter the distance between the track 128 and the cylinders 124 to vary the compression ratio of the engine 120.

In operation, the track 128 and case 126 remain stationary and the cylinder assembly rotates. The head 138 of the engine 120 may be interconnected with the case 126 such that it also remains stationary. This barrel engine also is a port design that avoids the use of poppet valves illustrated in previous embodiments. A generally spherical depression 140 in the head 138 mates with a corresponding spherical surface 142 on the top of the cylinder assembly. As the cylinders rotate with respect to the head 138, openings in the surface 142 and depression 140 align with one another to allow intake and exhaust into and out of the cylinders 124. The engine is illustrated in a position where an opening 144 in the depression 140 of the head 138 aligns with an opening 146 in the main surface 142 allowing gaseous communication between the combustion chamber 148 and an intake or exhaust runner 150. As will be clear to those of skill in the art, the head 138 and cylinder assembly may be designed such that ports open and close as the engine rotates so as to provide properly phased intake and exhaust. Also, this spherical interface between the depression 140 and surface 142 provides some sealing benefits. Basically, a seal supported in the opening 146 in the surface 142 is held in place by the spherical interface. In various engine configurations, spark plugs, fuel injectors, and/or glow plugs 152 may be supplied in the upper end of the cylinders 124.

The variable compression ratio device 134 illustrated in engine 120 may be of any design described herein, including being a hydraulic collar, a mechanical collar, or any other device that allows adjustment in position of the track 128. One alternative is the provision of multiple independent hydraulic lifters that press upwardly on the track 128 at various positions around the engine.

As an alternative to the operation just described for the engine 120, the case 126 and track 128 may instead rotatable, with the cylinder assembly, consisting of the cylinders 124 and powershaft 122, being stationary with respect thereto. A common characteristic of each embodiment of a barrel engine according to the present invention is that the cam surface and cylinders rotate with respect to one another. The track may be held stationary with the cylinders rotating, or the cylinders may be held stationary with the track rotating. Each variation offers its owns set of benefits and drawbacks and may be selected based on the requirements of the particular application.

Figure 10:
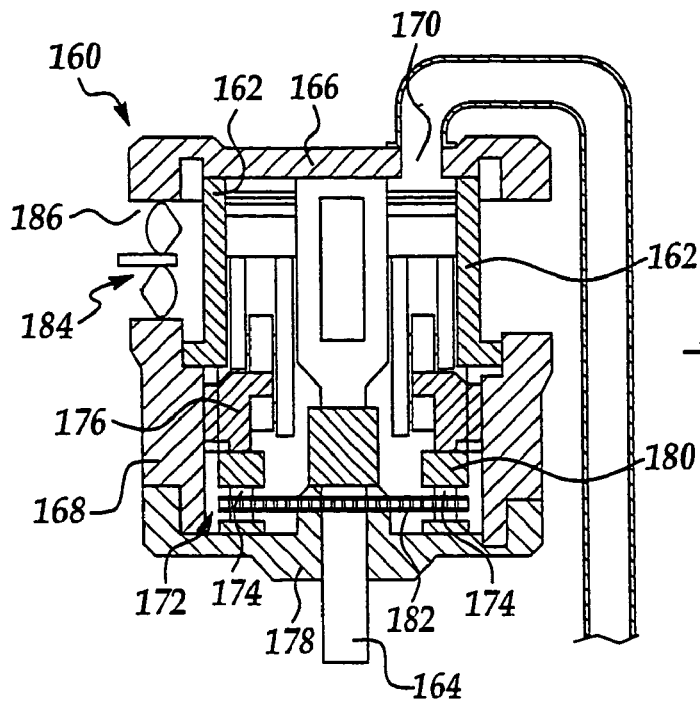
FIG. 10 is a cross-sectional view of yet another embodiment of a barrel engine with a variable compression ratio device.

Referring now to FIG. 10, another alternative embodiment of a barrel engine according to the present invention is shown generally at 160. This design is again configured such that it may be constructed as a rotatable cylinder engine with the cylinders 162 and powershaft 164 rotating in unison. In this version, a generally flat plate head 166 is interconnected with the case 168 such that the cylinders 162 rotate with respect to the head 166. A port opening 170 is shown in the head 166 for allowing gaseous communication between a combustion chamber and an intake or exhaust runner. An alternative mechanical variable compression ratio device is shown generally at 172. The variable compression ratio device 172 includes a plurality of power screws 174 that engage the underside of the track 176 for moving the track 176 closer to and further from the cylinders 162. In some embodiments, the track 176 may rotate with respect to the bottom plate 178 of the case. In this case, a thrust bearing or thrust collar 180 is provided above the power screws 174. The power screws 174 may be individually powered or may be chain-driven by a chain 182 that is in turn driven by a motor, not shown. The motor may be hydraulic, electric, or mechanical of any type. Also shown is an engine cooling fan 184 sent into an opening 186 in the case 168 for directing cooling air against the cylinders 162. This is one alternative method of providing cooling to the engine, especially where the cylinders 162 rotate with respect to the case, thereby providing their own agitation of the air around the cylinders. Liquid-based cooling systems may also be provided, as will be clear to those of skill in the art.

The various designs for variable compression barrel engines described herein may be altered in various ways as will be clear to those of skill in the art. For example, a variety of valve or port designs may be used for providing intake and exhaust to the cylinders. Barrel engine designs according to the present invention may use practically any port or traditional valve design, with the valves or ports moved or actuated in any of a variety of ways including the methods discussed in the incorporated priority documents. Also, the barrel engines may be altered by changing the angles of the cylinders with respect to the powershaft. A variety of applicant's prior applications, incorporated herein by reference, describe so-called Inverse Peristaltic Engines. Various aspects of these engines may be incorporated into a barrel engine. Also, barrel engines, as defined herein, should be considered to include applicant's other designs for Inverse Peristaltic Engines insofar as a cam surface moves with respect to cylinders to reciprocate pistons within the cylinders. An additional engine design that may be used to provide variable compression ratios is sometimes known as a nutating engine. Examples of nutating engines are shown in U.S. Pat. Nos. 6,019,073 to Sanderson and 5,992,357 to Tasi. Some nutating engines designs allow for variable compression ratios and may be used in accordance with various aspects of the present invention.

The provision of a variable compression ratio device in a barrel engine, as defined herein, provides numerous benefits. Compression ratios may be adjusted depending on a variety of factors, including engine speed, engine load, fuel quality and type, and other factors. A variable compression ratio barrel engine may be used with air-cooled, liquid-cooled, four-stroke, two-stroke, spark-ignition, and/or Diesel strategies, as well as strategies not discussed herein. A variable compression ratio barrel engine according to the present invention is also particularly applicable to use with HCCI. Variable compression ratio approaches other than described herein may also be used with the HCCI combustion strategy. For example, a variable compression ratio device may be provided that includes some type of plunger provided in the head or cylinder of the engine with movement of the plunger changing the compression ratio of the engine. SAE paper 1999-01-3679, incorporated herein, describes such a variable compression ratio device. According to the present invention, such a plunger can be provided in a barrel engine for use with HCCI. Another variable compression ratio design is shown in the following patents and publication: U.S. Pat. Nos. 5,329,893 to Drangel et al. and 5,443,043 to Nilsson et al, and PCT publication No. WO 92/09798 to Drangel et al, incorporated herein in their entirety by reference. This variable compression ratio design for an internal combustion engine may be used with HCCI according to the present invention as described in applicant's provisional patent application Ser. No. 60/267,598. A barrel engine may also be modified to use a variable compression ratio approach similar to that proposed in the incorporated patents and publication. To applicant's knowledge, the use of the variable compression ratio design disclosed in the incorporated documents with an HCCI combustion strategy is a novel combination.

Using Variable Compression Ratio Devices to Control HCCI Engines

Variable compression ratio devices, especially those disclosed and/or claimed herein, provide a particularly good method of controlling HCCI. As compression ratio is increased, autoignition of a combustable mixture of air and fuel occurs earlier. Conversely, as the compression ratio is decreased, autoignition occurs later or not at all. With a variable compression ratio device, the compression ratio of the engine may initially be set somewhat low. During starting, a mixture of air and fuel is drawn into the cylinders and compressed by the engine. The compression ratio is slowly increased until autoignition occurs in some or all of the cylinders at or near top-dead center. Preferably, the initial compression ratio is set to allow rapid start, to avoid excess emissions. The engine is then running and the compression ratio may continue to be increased until combustion phasing is optimized. If the combustion begins to occur too early, the compression ratio can be backed off until the condition is remedied. In an application wherein the engine is to be run at a constant load and RPM, the compression ratio may be adjusted until optimal conditions are reached and then left at this setting until load, speed, or other factors are changed. Adjustments may also be made for fuel type or other changes. In an engine that will experience variations in speed or load, such as an automobile engine, more sophisticated control is required. In this situation, an engine controller needs to precisely and quickly control the compression ratio to maintain combustion and to optimize combustion phasing. Over time, an engine controller can "learn" what settings are appropriate under a particular combination of conditions. When this combination of conditions is repeated, the engine controller can return the variable compression ratio to this setting that previously worked for those conditions.

In order to allow the engine controller to optimize combustion phasing, it is necessary to somehow determine when combustion is occurring in all or some of the cylinders. A new method disclosed in this invention uses knock sensors such as those that are found in many engine applications to monitor combustion. A more standard method of monitoring HCCI combustion would include various types pressure transducers, such as strain gauges and piezoelectric devices or others that may be located in the cylinders, head bolts, spark plugs or other places to allow monitoring of the pressure conditions in the cylinder.

As with any compression ignition engine, HCCI may give off a knocking sound (similar to that generated by conventional diesel engines). This knocking sound should make for an effective method of monitoring combustion. A knock sensor or other types of vibration or sound sensing devices may be used to detect this knocking sound and relay data to the engine's control unit.

A more standard method of monitoring HCCI combustion would include various types pressure transducers, such as strain gauges and piezoelectric devices or others that may be located in the cylinders, head bolts, spark plugs or other places to allow monitoring of the pressure conditions in the cylinder. It may also be possible to use various types of light or electromagnetic radiation sensors.

Whether the engine uses a knock type sensor, pressure transducer, or other device, feedback from the sensing device would be fed into the control unit and compared against the mechanical position of the pistons at that moment in time. If combustion were occurring too early, the control unit would send a signal to the variable compression ratio device to lower the engine's compression ratio. The lowered compression ratio would cause the pressure/temperature necessary to ignite the air-fuel mixture to be reached when the pistons are closer to top-dead center. In order to allow the engine to accept a multitude of fuels and to ensure that combustion will always occur at an optimum time, the control unit will steadily increase the engines compression ratio until the combustion sensor indicates that combustion is occurring too early. To increase the speed at which the engine can navigate through a changing range of loads and RPMS, the control unit may learn to map what the ideal compression ratio should be under different commonly occurring circumstances. Such a map may be somewhat generic, as the variables from any given period of time would cause it to need to be continuously updated and rewritten. In addition to the conventional necessary elements, the engine system may include a sensor at the fuel tank that would indicate to the control unit that the fuel tank has been opened and may contain a different fuel. Other approaches to determining fuel type and quality may also be used, including manual input, various fuel sensors, and other approaches. As a precautionary measure, the control unit would then start the engine at a lower compression ratio to ensure that combustion will not occur too early (which may cause damage to the engine) and then slowly increase the compression ratio until ideal combustion is reached. Additional precautionary measures of this type may be taken by engineering the slope of the undulating track such that it has a more gradual compression stroke near TDC and a steeper power stroke near TDC. Such a structure would minimize the mechanical advantage that the pistons would have if combustion were to occur too early.

An additional option using knock sensors that is more along the lines of what knock sensors are used for in non-HCCI applications would use knock sensors to detect knock. In this system, feedback from sensors that measure crank angle, engine speed, load, temperature and other parameters would be compared against a generic control map that would indicate the correct variable compression ratio or other phasing adjustments for the engine's various operating parameters. If, while following the control map, knock exceeds a certain acceptable limit, the engine's control unit would: directly lower the compression ratio and then update the control map, would switch to a different control map, usually used for a different fuel, or would update the current control map and follow the new instructions which would likely recommend a lowered compression ratio. In order to constantly keep the control map updated and to maintain optimum efficiency and power, the control unit would gradually increase the engine's compression ratio from time to time until the engine begins to knock. When this self-induced knock begins to occur, the control unit would gradually reduce compression ratio or any other phasing devices until the knock subsides. A record of when this knock began or subsided and the operating conditions of the engine at this time would be recorded and used to keep the control map continuously updated.

Figure 39:
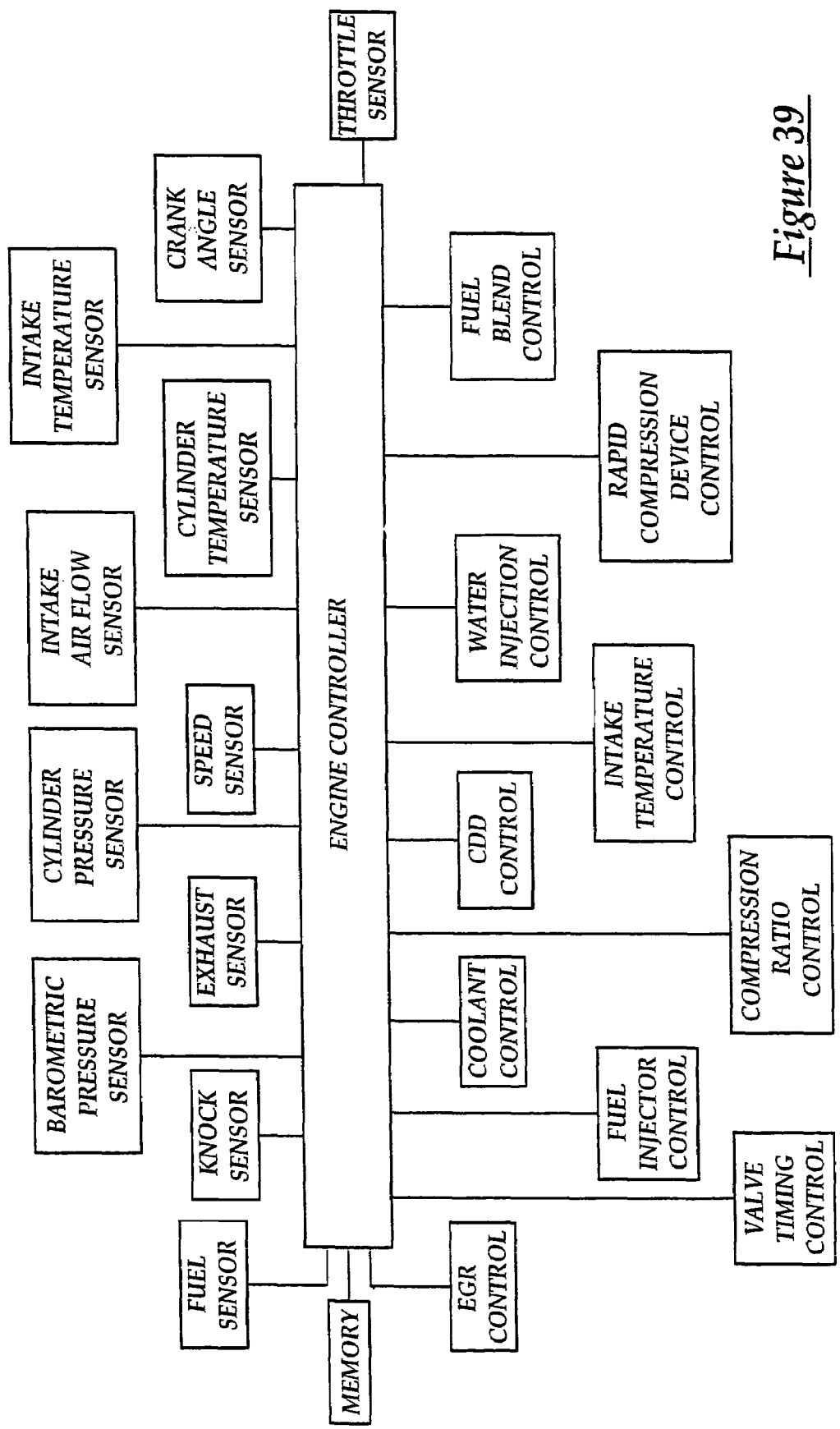
FIG. 39 is a schematic representation of an engine controller with a plurality of sensors and controls communicating therewith.

FIG. 39 shows a control system with a plurality of sensors and controls communicating with an engine controller. Various combinations of the illustrated elements may be used to provide adequate engine control.

Control of Combustion Phasing

It is very important in an HCCI engine to control the combustion phasing. Premature autoigntion not only reduces the engine's efficiency, but may be destructive to the engine. If combustion occurs too late, the engine's efficiency is reduced. If the conditions are too far from optimal, combustion may not occur at all. At high loads, phasing of combustion in HCCI engines becomes increasingly difficult and must be very precise in order to prevent detonation and or preignition from occurring. Currently, high load HCCI is very difficult or impossible to achieve at normal piston speeds without problems with detonation and or preignition prior to TDC.

In the past, high load HCCI combustion could only be achieved at extremely high piston speeds. The reason for this is that regardless of the engine's RPM, the duration of HCCI combustion is determined by time not crank angle. Therefore, at higher piston speeds, if ignition occurs before TDC, the mixture still does not have time to fully combust until the piston has cleared TDC. Unfortunately, high piston speeds are not acceptable for reliable operation, so HCCI combustion has been limited to low loads where the process can be better controlled.

At normal piston speeds, it is difficult to stabilize the air/fuel mixture long enough to clear TDC without preignition. If the engine's compression ratio is lowered or other means are used to delay the crank angle or crank angle equivalent at which the mixture reaches autoignition temperatures until closer to TDC, there is a risk that the fuel will not ignite during some cycles. There is a delicate balance between preignition on one end and failure to ignite on the other.

In light of the above, it is important to have a method to control combustion phasing, especially in an engine that experiences a variety of speeds and loads. As mentioned above, variable compression ratios allow control over combustion phasing. However, other approaches to controlling combustion phasing may also be used either alone or in combination with one or more other methods. Some of these methods of controlling combustion phasing are also applicable to combustion strategies other than HCCI.

Corona Discharge Device

One approach to controlling combustion phasing is to use a corona discharge device in the intake system to introduce radicals, including ozone ($O_3$), into to the air-fuel mixture in order to vary mixture reactivity. A corona discharge device (CDD), also commonly referred to as a plasma generator or a non-thermal plasma generator, may use either alternating or direct current and may be placed within the intake manifold of the engine in order to introduce or generate ozone ($O_3$), ions and radicals into the intake air or mixture. The corona discharge device may be placed before or after the fuel injectors, depending on what will offer the most favorable results or what is most compatible with the location of the injectors.

For purposes of definition, a corona discharge device is a device that uses high voltages to ionize the gasses in its proximity. When atmospheric oxygen ($O_2$) is ionized, the atoms can recombine to form $O_3$ (ozone). $O_3$ is a powerful low temperature oxidizer that is often produced commercially to be used to remove odors from cars and houses. A corona discharge device may be of several designs and may generate thermal or non-thermal plasma. One design that has been used in vehicle exhaust systems to create ions is discussed in SAE paper no. 2000-01-3088, incorporated herein by reference. The designs discussed in the incorporated paper may be used as part of the present invention, or may be modified for use as part of the present invention. Other designs will be apparent to those of skill in the art. For purposes of the present invention, a corona discharge device may be defined to be any device that ionizes gases or creates radicals. By introducing radicals into the intake, the mixture reactivity can be altered. By altering the mixture reactivity, the phasing or initiation of combustion can be controlled within certain limits. Adding to or generating radicals in the air-fuel mixture can alter the mixture reactivity. It is believed that increasing the amount of radicals advances combustion phasing in an HCCI engine and decreasing the amount of radicals delays combustion. The amount of radicals produced, and therefore, the mixture reactivity, can be altered by varying the voltage or duty cycle of the corona discharge device. It may also be possible to adjust the current. The amount of radicals produced may also be altered by employing a corona discharge device with multiple elements (either corona wires, dielectrics, or similar components) or by using multiple corona discharge devices. In a corona discharge device with multiple elements, activating or deactivating different numbers of elements at a time would control the amount of radicals generated. If multiple corona discharge devices were used, activating different numbers of corona discharge devices at different times would control the amount of radicals produced. Regardless of what type of corona discharge device is used, it is preferred that an engine control unit communicate with and control the corona discharge device to optimize combustion phasing.

The use of a corona discharge device to adjust combustion phasing may be used independently or in combination with any other aspect of the present invention. Also, corona discharge devices may have applicability outside of HCCI engines. The introduction of radicals in compression ignition engines such as HCCI, Diesels, compression ignited natural gas engines and other types may help to improve combustion and will lower the compression ratios needed in order to achieve compression ignition. There may also be applications for improving combustion in spark-ignited engines.

In one combination, one or more corona discharge devices are used in combination with a continuously variable compression ratio device for enhanced control of an HCCI engine. A corona discharge device should provide a fast and effective means for varying the mixture reactivity and combustion phasing, thereby reducing the demand placed on a continuously variable compression ratio device. In certain applications it may be possible to eliminate the continuously variable compression ratio device entirely, and control the phasing of combustion with the corona discharge device. In most cases, however, the corona discharge device would be used in unison with the continuously variable compression ratio device and/or other phasing devices or techniques in order to further expedite the engine's ability to respond to changes in load and speed, and to different fuels.

Figure 11:
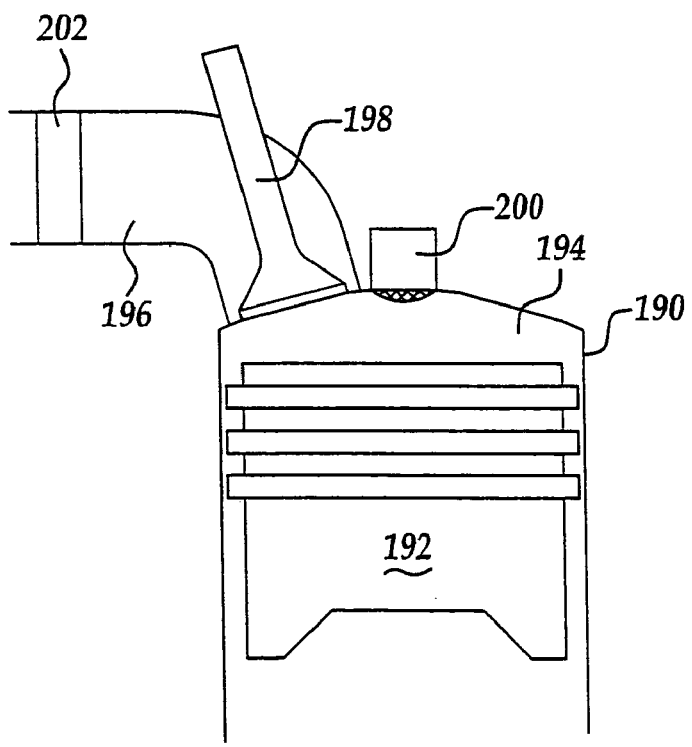
FIG. 11 is a schematic representation of a cylinder and piston with a corona discharge device according to the present invention.

FIG. 11 provides a schematic representation of a combustion cylinder 190 with a piston 192 positioned therein. A combustion chamber 194 is defined between the piston 192 and the closed upper end of the cylinder 190. An intake runner 196 is shown in communication with the combustion chamber 194. An intake valve selectively closes off the intake runner 196 from the combustion chamber 194. An exhaust runner and valve, not shown, would also be provided in a working engine. It should be noted that while a combustion chamber is defined in a cylinder with a reciprocal piston in many of the illustrations herein, the present invention is not limited to this configuration, but instead may be used with other configurations. Also, port designs, or alternative valve designs, may be used in place of the traditional valves illustrated herein without departing from the scope of the present invention.

In FIG. 11, a corona discharge device 200 is shown disposed in the closed upper end of the cylinder 190. A second corona discharge device 202 is shown disposed in the intake runner 196. Positioning a corona discharge device in the intake system, either prior to or after addition of fuel, is currently preferred. However, a corona discharge device positioned to introduce radicals directly in the combustion chamber may be additionally or alternatively provided. In one embodiment, a corona discharge device is provided in the main intake system to provide radicals to multiple cylinders. Additional, cylinder specific, corona discharge devices may also be provided in the respective intakes of each of the engine's individual cylinders, especially for use in smoothing out cylinder-to-cylinder variations, as discussed hereinbelow.

In order to minimize unburnt hydrocarbon (HC) emissions, it may be advantageous to place one or more corona discharge devices within the head area or walls of each cylinder, such as corona discharge device 200, in order to ionize the air or air-fuel mixtures near the inner surfaces of the cylinders. It may be possible to use the cylinder and/or head and/or piston as the actual elements of the corona discharge device. Such an arrangement would ensure thorough ionization of the air or air-fuel mixture near and/or in contact with these areas. Probably the best way to do this would be to use a ceramic-coated cylinder or cylinder liner as the dielectric. Ionization would be most concentrated in the crevice areas between the piston crown and cylinder and in the areas where the head is adjoining the cylinder. It is in these areas that most hydrocarbon emissions occur and that the largest improvements would be realized.

Another method of increasing combustion efficiency may be to place a microwave-producing device within the cylinder. The microwaves would ionize the air fuel mixture near the surfaces on which they are impinging. Microwaves may also enhance the efficiency of using water to prevent quenching by accelerating the rate at which the wet surfaces evaporate. Gamma or X-ray, Infra-red or other electromagnetic devices placed within the cylinders may also produce similar effects, although their influence on water will not be the same. It may also be possible to use a cathode to produce electrons within the cylinders to aid in ionization.

Rapid Compression Devices

Another method of controlling HCCI combustion phasing is through the use of a rapid compression device. For purposes of the present invention, a rapid compression device is any auxiliary device (i.e. other than the primary compression device, such as the primary piston in a reciprocal piston engine) that rapidly increases the compression level in a combustion chamber at a particular time. In an HCCI engine, a rapid compression device may be used to initiate combustion. For example, the compression ratio of an HCCI engine may be set such that a combustable mixture in a combustion chamber is not compressed sufficiently to cause autoignition. Then, at approximately top-dead center, a rapid compression device may be used to increase the compression pressure in the combustion chamber sufficiently to initiate autoignition. When using a rapid compression device to aid in ignition, the reactivity of or the time temperature history of the air-fuel mixture would likely be altered (continuously or permanently), through lowered compression ratios or any other means, just enough to allow the mixture to remain stable and to not detonate or preignite all the way up to or past the crank angle or crank angle equivalent at which ignition is desired to occur. When the engine has reached the correct mechanical position, combustion is initiated by rapidly compressing the mixture until it autoignites. Because this rapid compression is not directly facilitated by the piston, it is possible to autoignite the mixture and commence successful HCCI combustion at or, even after, TDC. Rapid compression may be employed at times when it becomes difficult to properly phase combustion, at times at which it can be used to extend the load range of HCCI combustion and at times when it can be used to lower vibration and/or pressure rises within the engine. The use of a rapid compression device is particularly promising for avoiding HCCI preignition at high loads. By causing rapid compression at or near TDC (in order to reach temperatures and pressures high enough for autoignition), compression phasing may be controlled without requiring unacceptable piston speeds.

Rapid compression may be achieved through a number of mechanical means, i.e. plungers, compressed gas injectors, hot gas injectors, etc., or through indirect combustion chambers, stratified charge techniques, the use of a pilot charge and through other means. It may also be possible to achieve similar effects with light, sound waves, vibrations, various types of radiation, magnetic fields and other means. However, in the interest of maintaining the lowest possible emissions and production costs, the rapid compression devices and techniques described below will likely be preferred.

Figure 12:
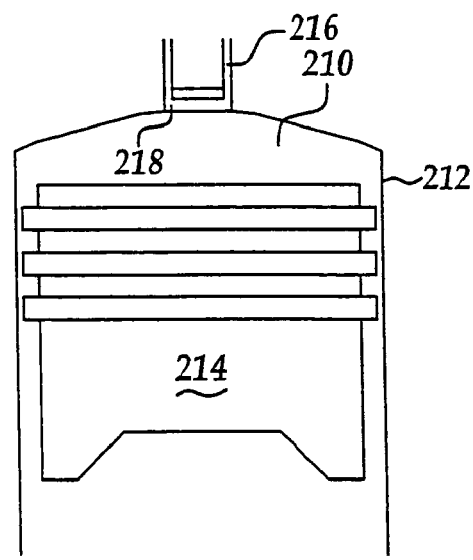
FIG. 12 is a schematic representation of a cylinder and piston with a mechanical rapid compression device disposed in the upper end of the cylinder.

Mechanical rapid compression devices are shown in FIG. 12 and disclosed in U.S. Pat. No. 6,260,520 to Van Reatherford (incorporated herein by reference). FIG. 12 provides a schematic representation of a combustion chamber 212 defined between an upper end of a piston 214 and a closed upper end of a cylinder 212. Other components necessary for an engine, such as intake and exhaust runners and valves or ports are omitted for simplicity. A mechanical rapid compression device is provided in the closed upper end of the cylinder. The device includes a movable plunger 216 positioned in a chamber or passage 218. By moving the plungers 216 towards the combustion chamber 210, the compression level in the combustion chamber 210 may be raised rapidly. For example, the plunger may be retracted somewhat with respect to the closed upper end of the cylinder 212 during the compression stroke of the piston. Then, at or near top-dead center, the plunger is rapidly moved downwardly in order to rapidly raise the compression level in the combustion chamber 210 and aid in facilitating autoignition.

Referring now to FIG. 13, a different approach to providing a rapid compression device will be described. Again, a schematic representation of a combustion chamber 220 is illustrated, as defined between a piston 222 and a closed upper end of a cylinder 224. In this illustration, intake valves and passageways are also illustrated, though other valves, as well as port designs, may be used. A secondary chamber 226 is illustrated in gaseous communication with the main combustion chamber 220. A spark plug 228 has electrodes that extend into the secondary chamber 226 for introducing a spark into the secondary chamber 226. A spark arrestor or flame arrestor 230 is disposed between the main combustion chamber 220 and the secondary chamber 226 such that gases passing between the two chambers pass through the arrestor 230. During operation of an engine using this design of a rapid compression device, a combustable mixture of air and fuel is introduced into the main combustion chamber 220. Some of this mixture will naturally pass through the arrestor 230 into the secondary chamber 226. As the piston 222 moves upwardly to compress the mixture, more of the combustable mixture will be squeezed into the secondary chamber 226. At approximately top-dead center, a spark is introduced into the secondary chamber 226 by the spark plug 228. The spark combusts a portion of the mixture in the secondary chamber 226, thereby producing a hot, gaseous combustion product. Due to the combustion, this combustion product expands very rapidly such that it is pushed back through the arrestor 230. As it passes through the arrestor 230, flame and spark is extinguished such that only a hot gas product, without flame, enters the main combustion chamber 220. This rapidly raises the level of compression in the main combustion chamber 220. Preferably, the combustion in the secondary chamber 226 occurs near top-dead center and the rapidly rising compression subsequently caused in the main combustion chamber 220 is sufficient to cause autoignition of the mixture in the main combustion chamber 220. While a traditional design for a spark plug 228 is illustrated, other designs may be used, as well as other devices for igniting the mixture in the secondary chamber. A combustible mixture may be introduced into the secondary chamber in other ways than described above. For example, a combustible mixture may be injected or drawn into the secondary chamber through an injector or valve of some type. Also, the mixture in the secondary chamber maybe different than the mixture in the main chamber. Additional fuel could be injected into secondary chamber to create a richer mixture. A different fuel could also be used.

For purposes of the present invention, a spark arrestor or a flame arrestor is any device that allows the passage of gasses but blocks or extinguishes all or most of the flame or spark in the gasses. The flame arrester may consist of a number of different materials and may be constructed in a number of different manners. It may be important to prevent the flame arrester from overheating. Possible problems with overheating may be addressed by constructing the arrester with materials capable of enduring high temperatures, such as ceramics or alloys of tungsten nickel and iron or other high temperature materials, or by supplying a method of cooling the arrester. To cool the arrester it may be possible to simply recess the arrester end of the rapid compression device into the head of the engine. By recessing the arrester into the head, cooling will be provided by the engine, whether the coolant of the engine is in direct contact with the device or whether the metal in the proximity of the device remains sufficiently cool to draw enough heat away from the device. The flame arrester may include a number of perforated plates, a single perforated plate, a mesh like matrix, a long tube, a series of long tubes ether in parallel or in series, a series of baffle plates or any other means capable of extinguishing a flame without drawing too much heat away from the gasses. It may also be possible to extinguish a flame through the careful placement or stratification of EGR (recirculated exhaust gasses) or air within the device or within the engine's main combustion chamber.

A spark-ignited combustion based rapid compression device according to the present invention has a side effect of introducing a high temperature charge into the main combustion chamber and may provide additional radicals or combustion byproducts that help to induce or facilitate autoignition. When pressure builds in the chamber of the device, much of the burning charge is extinguished prior to fully combusting as it is forced through the flame arrester. Therefore, partially burnt fuel, which is in many cases more reactive than unburnt fuel, is injected into the engine's main combustion chamber. This increases the reactivity of the mixture and may aid in initiating autoignition.

Referring now to FIGS. 14 and 15, an additional embodiment of a combustion based rapid compression device is illustrated generally at 232. FIG. 15 illustrates the rapid compression device 232 by itself, while FIG. 14 illustrates the device 232 positioned in the top of an engine in communication with a combustion chamber 234. In the embodiment of FIG. 13, a secondary chamber was provided in the engine, such as in the head of the engine. This requires the formation of a secondary chamber in the head or block. The version of FIGS. 14 and 15 provides a spark plug-like device that screws into a threaded hole into the head of the engine, and extends into the combustion chamber 234.

The device 232 has a body 236 with a chamber 238 defined therein. The outer portion of the body 236 is threaded or otherwise configured to engage an opening in the engine so as to dispose the chamber 238 in the body 236 in gaseous communication with the combustion chamber 234. The chamber 238 has an opening that is filled by a gas permeable spark arrestor 240, such that gas flowing between the chamber 238 and the combustion chamber 234 passes through the arrestor 240. Electrodes 242 extend into chamber 238 in the body 236 for introducing a spark. This rapid compression device 232 operates according to the same steps as described with respect to FIG. 13. As illustrated, the electrodes 242 are part of a spark plug 244 that is threaded into an upper opening into the chamber 238. However, the spark producing electrodes may be formed as part of the overall device 232 instead of being part of a spark plug that is removable therefrom. Also, other types of spark providing devices, as well as other approaches to igniting the mixture in the chamber 238, may be used. The device 232 has the benefit that the body 236 may be removed from the engine for replacement or cleaning. For example, it may be necessary during operation of an engine to periodically change the spark arrestor 240. In versions in which a spark plug is used, the spark plug may also be changed.

Figure 17:
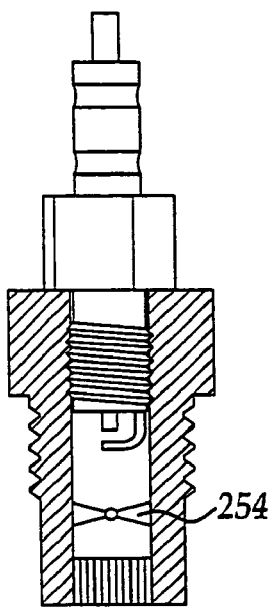
FIG. 17 is a cross-sectional view of another modified version of a spark-ignited rapid compression device according to the present invention.
Figure 18:
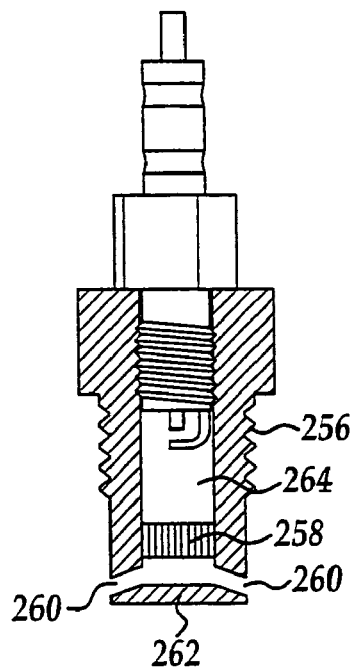
FIG. 18 is a cross-sectional view of an additional embodiment of a spark-ignited rapid compression device according to the present invention.

FIGS. 16-25 illustrate alternative embodiments of spark-ignited combustion based rapid compression devices similar to the ones previously described. Various features of each of the devices may be combined differently than illustrated. In the embodiment of FIG. 16, the device 250 has a baffle plate 252 provided near the bottom of the chamber to facilitate turbulence and/or swirl within the chamber as well as in the combustion product exiting the chamber. FIG. 17 shows another version of the rapid compression device wherein a turbine type blade 254 is provided in the chamber to facilitate swirl. In the version of FIG. 18, the body 256 extends downwardly beyond the arrestor 258 and has an end cover 262 with nozzles 260 in the sides thereof. This creates a more convoluted route into and out of the chamber 264 to facilitate swirl. Also, the nozzles 260 may be aimed in various ways so as to allow the hot gas flowing out of the rapid compression device to be directed as desired within the combustion chamber. The nozzles 260 may also be angled to facilitate swirl. The end plate 262 may also provide some protection for the flame arrestor 258, thereby avoiding direct impingement of the pressure wave within the main combustion chamber onto the flame arrestor 258. Nozzles of various designs, as well as other features just described, maybe used with the embodiment of FIG. 13 as well.

Figure 19:
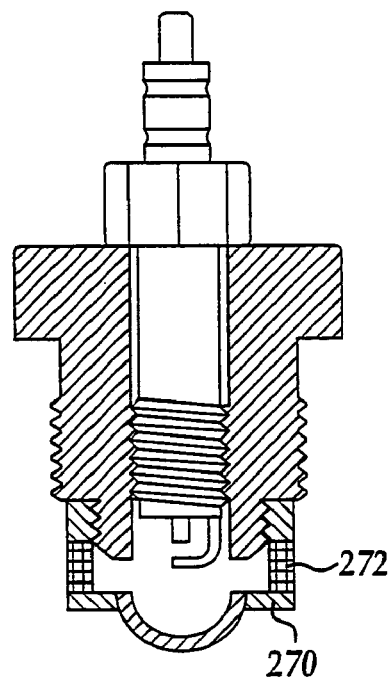
FIG. 19 is a cross-sectional view of yet another embodiment of a rapid compression device according to the present invention.

FIG. 19 is another alternative embodiment, wherein the body 270 is very compact and the flame arrestor 272 is in the sides of the 270. The flame arrestor 272 may be a circumferential ring, or may be in individual windows in the sides of the body 270.

Figure 20:
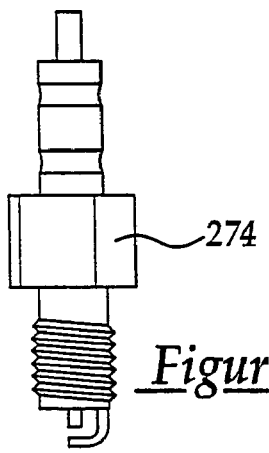
FIG. 20 is a front elevational view of a spark plug.
Figure 21:
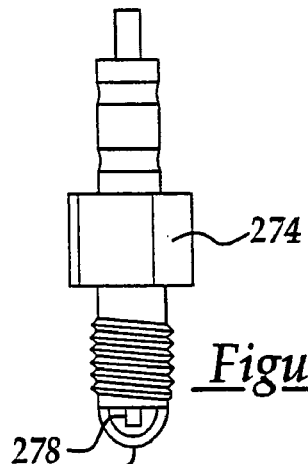
FIG. 21 is a front elevational view of a modified version of a spark plug with a ground electrode that passes above the center electrode.
Figure 22:
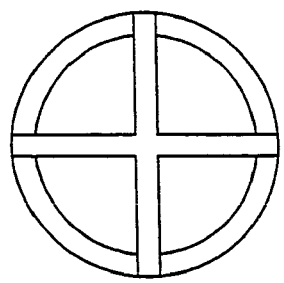
FIG. 22 is an end view of another version of a ground electrode for use with a spark plug.
Figure 23:
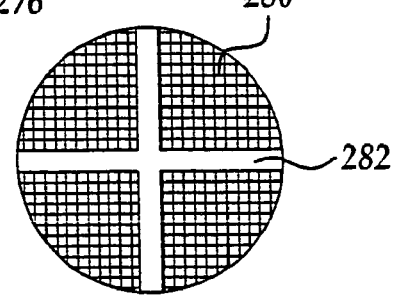
FIG. 23 is an end view of the ground electrode of FIG. 22 modified to include a spark arrestor.

FIGS. 20-23 illustrate various views of a spark plug modified to operate as a rapid compression device. FIG. 20 illustrates a traditional spark plug 274. In FIG. 21, the spark plug 274 has a modified grounding electrode 276 that arcs over the central electrode 278. FIG. 22 is an end view showing grounding electrodes that cross over the center electrode in a cross formation. In FIG. 23, a flame arrestor 280 has been attached to or integrated with the cross shaped electrodes 282. The spark arrestor 280 encloses an area surrounding the center electrode so as to define a chamber into which a spark may be introduced by electricity arcing between the center electrode and the electrodes 282 or spark arrestor 280. This creates a combustion flame inside the flame arrestor 280 which extinguishes itself as it passes through the arrestor 280.

FIGS. 24 and 25 are a view of a rapid compression device formed like a typical spark plug but with a formed spark arrestor 284 replacing the ground electrode. The spark arrestor forms a dome over the center electrode.

FIG. 26 schematically illustrates the general concept provided by several of the previous rapid compression devices. Basically, a large combustion chamber 290 is separated from a secondary chamber 292 by a flame arrestor 294. An ignition source 296, which may be any method of igniting a combustable mixture in the secondary chamber 292, is also provided.

Referring now to FIG. 27, a different design for a rapid compression device will be described. As discussed with previous versions of spark ignited combustion based rapid compression devices, the compression level in a combustion chamber may be increased by injecting a pressurized gas. The rapid compression device of FIG. 27 comprises a gas injector 300 that communicates with a combustion chamber 302. The gas injector 300 is operable to feed a charge of pressurized gas into the combustion chamber so as to rapidly raise the compression level in the combustion chamber 302. In the illustrated embodiment, pressurized gas source 304 is provided along with a control device 306 for controlling the flow of the gas to the gas injector.

Other approaches may be used for providing the injection of hot gas into the combustion chamber. For example, hot high pressure exhaust gas from one chamber may be directed into a second combustion chamber when that second combustion chamber is near top-dead center so that the addition of the hot exhaust gas has a rapid compression affect, thereby triggering autoignition. FIG. 28 offers one version of using exhaust gas from combustion to later be used for rapid compression purposes. In FIG. 28, a combustion chamber 310 is defined between a piston 312 and the closed upper end of a cylinder 314. A secondary chamber 316 is separated from the main combustion chamber 310 by a valve 318 such that when the valve 318 is opened, the secondary chamber 316 is in gaseous communication with the main chamber 310, and when the valve 318 is closed, the two chambers are separated. As illustrated, the secondary chamber 316 is defined directly off of the main chamber 310. However, it may be provided in other ways that allow gaseous communication between the two chambers. Also, any design of a valve may be used which allows the chambers to be selectively interconnected and separated. For example, a rotary valve may be preferable for some applications. As a further alternative, the secondary chamber 316 may also communicate with other portions of the engine, such as intake runner 320 or exhaust runner 322.

In operation, combustion occurs in the main combustion chamber 301, thereby creating a pressurized gaseous combustion product. A portion of this product is then captured in the secondary chamber 316, and retained in the secondary chamber 306. As one example, the valve 318 may be held partially open during the combustion event in the main chamber 310. Alternatively, the valve 318 may be opened after the initialization of the combustion, such as at some point during the expansion or exhaust stroke. The valve 318 is then closed so that a portion of pressurized gaseous combustion product is held in the secondary chamber 316. During a subsequent combustion cycle, a mixture of air and fuel is compressed in the combustion chamber 310. At or near top-dead center, the valve 318 is opened to release the pressurized gaseous combustion product from the secondary chamber 316 into the main chamber 310. This preferably rapidly increases the compression level in the combustion chamber 310, sufficiently to initiate autoignition. The process may then be repeated.

As an alternative, gaseous combustion product may be captured from one chamber and used in another chamber to initiate rapid compression and autoignition. As just an illustrated example, if two combustion chambers are 90 degrees apart in phase, a portion of gaseous combustion product may be directed from the first combustion chamber 90 degrees after the combustion at top-dead center, into the second combustion chamber at or near top-dead center. This redirection of pressurized gaseous combustion product may be sufficient to initiate autoignition in the secondary combustion chamber. Other variations on this approach will be clear to those of skill in the art.

Rapid compression devices as discussed herein may be used to control combustion phasing in an HCCI engine of any design or configuration, and may be used alone or in combination with any other aspect of the present invention. They may be placed in the head of the engine, as illustrated, or elsewhere. Also, more than one rapid compression device may be used for each chamber, or more than one type may be provided in a single engine. A preferred embodiment uses a rapid compression device in a barrel engine configuration, which may also include a variable compression ratio device such as previously discussed. In an HCCI engine combining a variable compression ratio device and a rapid compression device, when and if the point is reached where preignition and/or detonation is beginning to occur, the engine's compression ratio can be lowered. If the lowered compression ratio is not sufficient to sustain HCCI combustion, the rapid compression device can be used to initiate combustion. Rapid compression techniques may also find application in other engine configurations. The spark ignited combustion based rapid compression devices described herein may have wider applicability, including applications outside internal combustion engines.

An additional method of rapid compression that may be preferred would use a secondary chamber, similar to that which is illustrated in FIG. 13, inside of which HCCI or autoignition would provide rapid compression for the main combustion chamber. To prevent quenching and to ensure that temperatures in the secondary chamber remain high enough for autoignition to occur there first, it will likely be necessary to include a form of insulation within the secondary chamber such as a ceramic coating of some type. It may also be possible to construct the secondary chamber of a ceramic composite or to use a ceramic insert.

In an HCCI engine using an HCCI powered rapid compression device, the reactivity of or the time temperature history of the air-fuel mixture would be altered (continuously or permanently), through lowered compression ratios or any other means, just enough to allow the mixture in the main combustion chamber to remain stable enough to not detonate or preignite before top-dead center. It may be necessary to adjust this to a low enough level where, if there was no rapid compression device, the engine would pass through top-dead center without ignition of the mixture. As the engine approaches top-dead center, the higher temperature and radicals present in the residual exhaust that remains within the narrower secondary chamber would cause HCCI combustion to occur within the secondary chamber before the main chamber. The pressure and heat generated from the HCCI combustion within the secondary chamber would pressurize the main combustion chamber and facilitate HCCI combustion. Since the conditions in the smaller secondary chamber were more conducive to HCCI combustion than the conditions in the main combustion chamber, there will be a delay from the time that combustion begins to occur in the secondary to the time that the secondary chamber provides enough pressure to initiate combustion in the main chamber. This delay should be sufficient to allow the main charge to be very near to or to clear top-dead center before it autoignites.

Since the secondary chamber would use HCCI combustion, it may or may not need a flame arrestor. If it does not need a flame arrestor and a spark plug is included in the chamber, flames from the spark plug will be able to propagate from the secondary chamber into the main combustion chamber. This will allow the engine to function in both spark ignited and HCCI modes without needing to include a spark plug outside of the secondary chamber. This will leave more space in the head of the engine. This will also allow compact integrated screw in devices similar in form to those illustrated in FIGS. 15, 16, 17, 18 and 19 to be used.

The preferred embodiment of this device would likely be most similar to that which is illustrated in FIG. 15 but would not include a flame arrestor. As mentioned earlier it would be important to provide thorough insulation inside the secondary chamber. Ideally the engine would start in a spark-ignited mode and remain in a spark-ignited mode until the secondary chamber reaches a high enough temperature for HCCI autoignition to occur within the secondary chamber prior to occurring in the main combustion chamber. At this time the engine would revert to HCCI mode and the compression from the HCCI combustion in the secondary chamber would facilitate HCCI combustion in the main chamber.

It may be beneficial to include a type of corona discharge device within the secondary chamber to create higher mixture reactivity in this area thus ensuring that autoignition occurs there first. It may be possible to modify the spark plug to double as a corona discharge device. It may also be beneficial to provide a heating means.

If the combustion stability offered by this rapid compression device (or any of the aforementioned rapid compression devices) is high enough, it may be possible to use a preset ignition point and do away with adjustable phasing altogether. However, with this device it will be possible to control phasing in the same manner as any type of HCCI engine, partly because this device uses HCCI, only in a two-step process. In order to maintain fuel versatility it would be best to supplement this device with phasing techniques.

As with the spark ignited rapid compression devices discussed earlier, the mixture in the secondary chamber maybe different than the mixture in the main chamber. Additional fuel could be injected into secondary chamber to create a richer mixture. A different fuel could also be used.

Again, there may be application for this device in other types of compression ignition engines and in lean combustion engines such as lean natural gas engines.

An alternative approach to providing a rapid compression device is through the provision of an opposed piston design, either in a crank driven or barrel engine design. In an opposed piston design, two pistons reciprocate in the same cylinder with a combustion chamber defined between the pistons. In an HCCI opposed piston engine, a combustible mixture of air and fuel is introduced between the two pistons and then the pistons are moved so as to compress the mixture until it autoignites. The pistons may be completely in-phase, that is reaching top dead center at the same time, or somewhat out of phase. For example, if one piston somewhat lags the other piston, the first piston may be slightly past top-dead center when the second piston reaches top dead center. The second piston may then act as a rapid compression device causing autoignition. This may effectively shorten the time in which the total engine dwells at top dead center. In a barrel engine design, an opposed piston design may be provided by having a central set of cylinders arranged around the central power shaft. The cylinders would have two open ends directed towards opposite ends of the engine. A first set of pistons would be positioned in the first end of the cylinders and a second set of pistons would be positioned in the second end of the cylinders. A track is provided at each end of the engine and is in mechanical communication with one of the sets of the pistons. As the tracks rotate, the pistons reciprocate in cylinders in order to provide the various strokes of a combustion cycle. Various designs may also be provided for crank driven engines. In one example, an upside down "V" design has two banks of cylinders that meet in a "V" at the normally closed ends of the cylinders. Two cranks would then be provided for operating pistons in opposite sides of the "V".

In addition to the rapid compression techniques disclosed above, an additional method of rapidly compressing the mixture near, at, or even after TDC would be to create a flame kernel of some type, the smaller the better, in order to rapidly compress the remaining charge and facilitate HCCI combustion. By igniting a small portion of the charge with lean combustion techniques, conventional combustion techniques, or with a pilot charge of some type, the rapid heating of the local area will raise the pressure in the entire combustion chamber and will commence autoignition.

For purposes of definition, lean combustion is generally described as a cycle similar to that of typical SI combustion, but occurring at very lean air/fuel ratios. Generally, special techniques must be implemented to ensure reliable and complete ignition under lean conditions. While lean combustion is similar in many ways to that of an SI cycle, combustion is not necessarily initiated with a spark. Lean combustion can be initiated with conventional spark plugs, plugs that are specifically designed for lean burn, corona injection, a pilot charge, and many other means, most of which are described in prior art relevant to the field.

At times when phasing of combustion becomes difficult or impossible to control with other means, or at times when a reasonable compromise between preignition and unreliable incomplete combustion cannot be reached, rapid compression may be used. In the case of a variable compression ratio engine, the compression ratio can be lowered to reduce or eliminate preignition and detonation. At this point, the compression ratio most likely will not be high enough to ensure reliable autoignition. In order to autoignite the mixture, a small lean combustion flame kernel can be created, such as by a spark plug. The flame kernel will cause rapid heating of the local area which will cause it to expand and rapidly compress the remaining unburnt charge. This additional compression, although it may not be significant, can be sufficient to facilitate reliable autoignition. The timing of the spark is adjusted to where the flame kernel will be large enough to autoignite the mixture at the desired time. Creating a flame kernel at top dead center will ensure that preignition will never occur, however, it may be desirable to advance or delay this ignition point under different conditions. When using a lean flame kernel to extend the range of HCCI, if the range can be extended far enough, this kernel may no longer be considered lean, and may in fact be stoichiometric.

Another rapid compression technique is to create an in-cylinder environment not conducive to lean combustion and use a lean combustion ignition device to create a flame kernel that is not capable of propagating past the direct vicinity of its ignition device. Such a technique may include a high power spark ignition device capable of spreading a spark over a wide area. When the spark from this device passes through the mixture, only the mixture directly in the path of or very near the spark will be ignited and will not be able to propagate through the remaining mixture. The rapid heating in this area, however, may still be sufficient to initiate autoignition. It may also be possible to use swirl chamber spark plugs, plasma injectors, some of the devices proposed earlier in this application without their flame arresters, a pilot charge, and other means to achieve a similar effect. Yet another approach to initiating autoignition, which may be used in the present invention, is to use a plasma injector.

For reasons expressed in the previous sections describing hot gas injection and spark ignited rapid compression devices, this application also proposes the use of carefully orchestrated in cylinder fluid mechanics or novel injection strategies, for fuel and/or air and/or EGR (recirculated exhaust) in order to provide sufficient stratification to extinguish a flame kernel before it can propagate throughout the entirety of the chamber as an additional rapid compression technique. With carefully orchestrated stratification techniques, it would be possible to create a flame kernel in a portion of the engine's combustion chamber, through conventional or unconventional ignition means, sufficient to commence autoignition of the remaining mixture without allowing a flame to propagate through the entire chamber. This can be achieved by promoting good conditions for ignition in the area surrounding the spark plug, pilot charge or other igniting device, and good conditions for autoignition in the remaining mixture. Between these two prepared areas, would be a barrier of inert or lean gasses. This barrier may consist of EGR, air or other gasses and will be too lean for a flame to propagate through. The barrier will, however, still allow the prepared mixture that lies beyond it to be auto ignited by compression from the flame kernel.

Dual Mode Engines

For some applications, it may be desirable to provide an engine that operates in an HCCI mode at some times and as a spark ignited or Diesel engine at other times. Variable compression ratio devices are particularly useful for this application. It may be advantageous to employ partial or full time lean combustion as an intermediate mode that will aid in the crossover between HCCI and spark ignition or diesel modes in dual-mode engines.

As was discussed earlier in this application, HCCI engines may have power outputs that are 50-75% of that of a similar Diesel or SI engine. As a remedy to this problem, it is possible to employ a dual mode strategy in which the engine operates in HCCI mode for up to 75% load and then reverts to a SI or Diesel mode when higher power is required.

Dual mode designs may also be used to ease starting of HCCI engines. As discussed previously, the compression ratio of a variable compression ratio HCCI engine needs to be adjusted to establish a starting condition. This can lead to excess emissions at startup. Alternatively, the engine could be started as a spark ignited engine and then switched into HCCI once it is running. This will allow for faster catalyst warm-up and will allow the engine to reach a stable operating temperature before reverting to HCCI mode.

One approach to switching modes is to gradually allow the lean combustion flame kernel to propagate further into the combustion chamber before autoigniting the remaining charge. Eventually, the flame will be allowed to propagate through the entirety of the charge and the engine will be running in lean combustion mode. As an example, the engine's compression ratio will be lowered slowly and/or its ignition timing will be adjusted. As the compression ratio is being lowered, the flame kernel will be allowed to (and will have to before autoignition will occur) propagate further and further into the combustion chamber before autoigniting the remaining charge. Eventually, the flame will be allowed to propagate through the entirety of the charge and the engine will be running in lean combustion mode. As load is increased, the air-fuel ratio will become richer and the engine will be in conventional stoichiometric spark ignition mode. While this may transpire in a fraction of a second, depending on the operating conditions, such a gradual crossover will not require any abrupt changes in the compression ratio or throttle position of the engine as would be if the engine were to change directly from HCCI to spark ignition mode.

Anther approach is to switch directly from HCCI mode to an intermediate lean burn mode. This may be used whether or not a lean burn kernel is used to extend the range of HCCI mode. As an example, the engine will rapidly lower its compression ratio to that which is acceptable for reliable lean combustion. Simultaneously, or immediately thereafter, the engine will be operating in lean combustion mode. Since the air fuel ratio for the high end of the HCCI mode and the low end of the lean combustion mode will not differ by any significance, the engine will likely still run with the throttle wide open. More than likely, power output during lean mode will be controlled through regulating the richness of the mixture, as in HCCI mode. As load is increased, the mixture will become richer.

For both of the above approaches, depending on the air/fuel ratios required, NOx emissions during lean combustion mode may be unacceptable if the engine is to remain in this mode for any length of time. If this is the case, the lean combustion mode will only be used to smooth over the conversion process and the control unit will be programmed to minimize the time that the engine operates in this mode ether by slightly extending the range of the HCCI mode or lowering the load range of the spark ignition mode at times when the engine is operating near or at the conversion threshold for an extended period of time.

Water Injection

Figure 29:
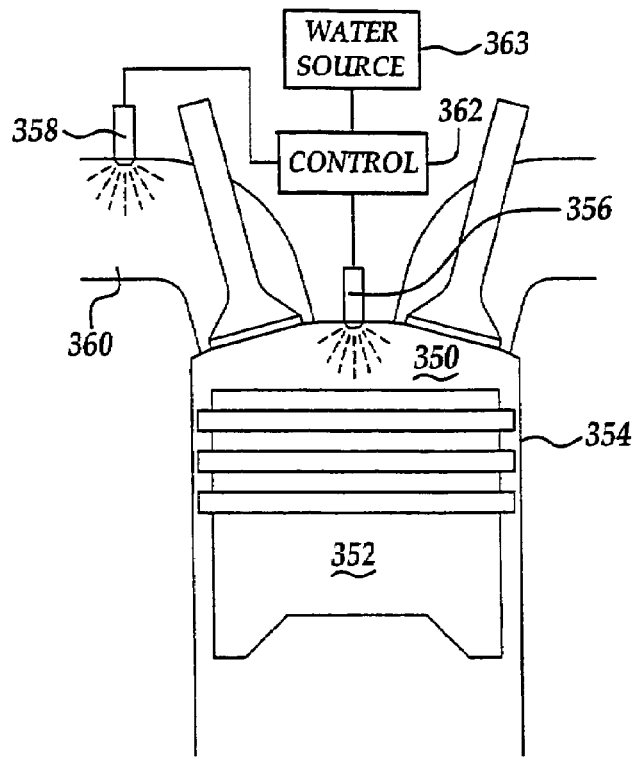
FIG. 29 is a schematic representation of a cylinder and piston with a water injection system shown diagrammatically.

Another method for controlling combustion phasing in an HCCI engine is through the use of water injection. A schematic representation of a combustion chamber and a water injection system is shown in FIG. 29. The combustion chamber 350 is defined between a piston 352 and the closed upper end of the cylinder 354. A water injection nozzle 356 is shown in communication with the combustion chamber 350 such that a spray of water may be provided to the combustion chamber 350. A second water injector is shown in communication with the intake runner 360. Water injection may be provided at either or both points so as to introduce water or water vapor into the combustible mixture that is going to be compressed in the combustion chamber 350. Introduction of water vapor tends to delay combustion due to autoignition. Therefore, by controlling the amount of water that is introduced to the combustible mixture, combustion phasing can be somewhat controlled. Though the system is illustrated having a water injector in both the cylinder and the intake runner, only a single injector may be required. The system is further shown to include a control 362 and a water source 363.

An additional method of reducing quenching, or cooling of the mixture to the point that it does not completely burn in some areas, would be to impinge water against or wet the most vulnerable inner surfaces or the crevice areas of the combustion chamber. When the water hits or wets the surface, it would turn into steam and lift the air-fuel mixture out of crevice volumes or quenching areas and into areas of the cylinder where it will burn more completely. For this purpose, a water injector may be provided that directs a spray at the crevice areas. The water vapor near the quenching surfaces may also provide a type of insulation. If water injection is used for reasons of evening out the cylinders or as a supplement or replacement for the CVCR device, it would be advantageous to direct the spray into areas vulnerable to quenching so that its purpose would be two fold. However, the use of water to prevent quenching in no way requires that water also be used to control mixture reactivity. As a further alternative, water or other substances may be mixed with the fuel so as to indirectly introduce these substances into the combustible mixture. The water injection system may also inject substances other than water so as to affect combustion phasing or crevice volume.

According to the present invention, water injection may be used with an HCCI barrel engine, either by itself or with other combustion phasing control approaches, such as variable compression ratio devices and/or corona discharge devices and/or rapid compression devices.

HCCI Barrel Engine with Non-Sinusoidal Track

Figure 30:
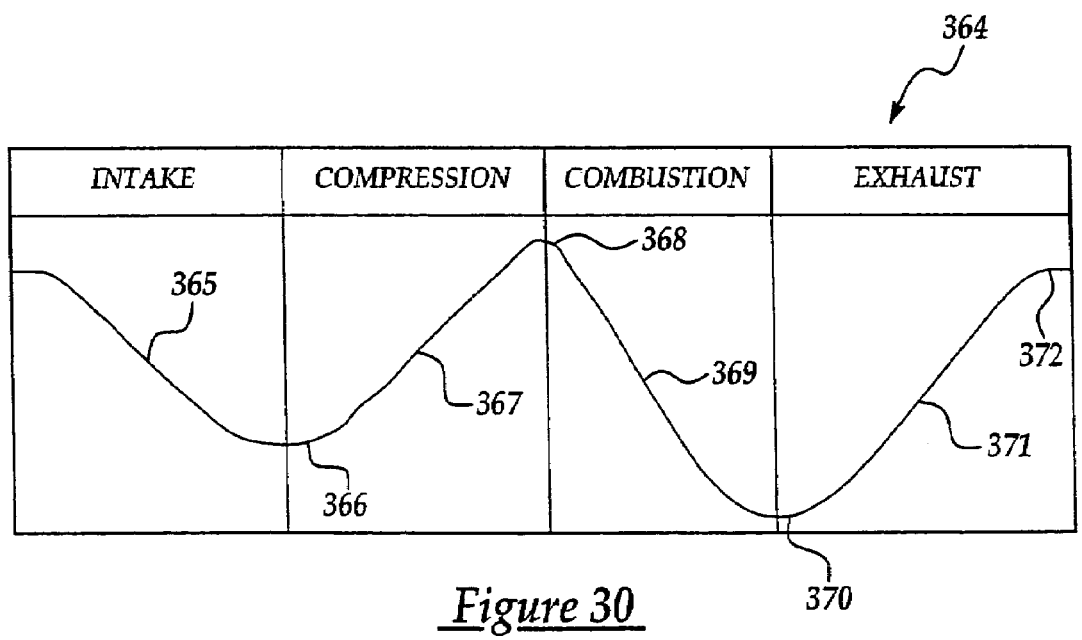
FIG. 30 is a graphical representation of a non-sinusoidal piston motion profile for use with engines according to the present invention.

As discussed previously, a barrel engine typically replicates the generally sinusoidal piston motion of a crank driven engine by having a track that is generally sinusoidal shaped. In tradition crank-driven engines, the piston motion is necessarily sinusoidal, as alterations from a sinusoidal shape are not possible due to the crank configuration. However, a barrel engine allows a designer to choose shapes other than a sinusoid. According to the present invention, it has been discovered that certain non-sinusoidal piston motion profiles provide advantages over a traditional sinusoidal piston motion profile. FIG. 30 illustrates a piston motion profile 364 that is non-sinusoidal. The profile includes a downward intake slope 365, corresponding to piston travel away from the closed end of the combustion cylinder and expansion of the combustion chamber. The intake slope ends with a transition through "intake bottom-dead center" 366. This is followed by an upward compression slope 367, which ends with a transition through "compression top-dead center" 368. The under proper conditions, combustion occurs at or near compression top-dead center 368, and the piston travels downward, as shown by combustion or expansion slope 369. The piston then transitions through "expansion bottom-dead center" 370 and begins upward movement, as indicated by the exhaust slope 371. The exhaust stroke terminates with a transition through "exhaust top-dead-center" 372, and the intake stroke 365 is repeated.

The power output of HCCI engines and combustion stability may be increased by countering the rate of pressure rise through faster piston speeds near top-dead center. Compression top-dead center 368 is illustrated as a more rapid transition than would occur with a sinusoidal profile. HCCI combustion strategies result in very high rates of pressure rise. Due to the contoured nature of the barrel engine track, piston speeds near top-dead center may be made considerably faster than in conventional crank driven engines. An increased rate of decent decompresses the mixture at a faster rate. This is illustrated in the steep slope of the combustion stroke 369. If combustion is timed so that it occurs at or just after TDC, the increased rate of decompression will counter the rate at which the pressure can rise. By lowering the rate at which the combustion pressure can rise, the mechanical stresses placed on the engine are reduced, allowing richer fuel-air mixtures to be used and therefore increasing the power output of the engine. The faster piston motion near top-dead center on the compression side allows the engine to pass through the autoignition threshold at a faster rate, making preignition and detonation less likely to occur. This increased combustion stability, as a result of non-sinusoidal motion, is another reason why barrel engines are better suited for HCCI than conventional engines.

In crank driven engines there is a dwell period in the areas near top-dead center during which the speed of the piston is considerably slow compared to other times during the cycle. This slow rate of descent occurs at a time when the ignited mixture is hottest and densest. The slow decompression at this time maximizes the heat exchange that can occur between the hot gasses and the coolant of the engine, resulting in significant losses in thermal efficiency. In a barrel engine using a non-sinusoidal piston motion profile, the rate of descent near top-dead center can be rapid in comparison, allowing the heat energy of the gases to be rapidly converted to mechanical energy and therefore minimizing the time that the gases remain at high temperature and density. By minimizing the time that the gases remain at high temperature and density, the thermal efficiency of the engine is significantly increased.

The profile 364 also illustrates a slower transition between intake 365 and compression 367. This may be provided to maximize the intake charge and to increase the effective valve closing speed. It also reduces the inertial forces on the piston and rollers. The compression stroke 367 is illustrated as occurring over a longer period than the combustion stroke 369.

In the profile 364, the combustion stroke 369 is shown as having more displacement than the compression stroke 367. This is another advantage to the barrel engine. A longer expansion stroke may be provided to allow more of the combustion energy to be captured and to allow a longer transition to exhaust, as shown. In a crank driven engine, the various strokes are necessarily identical in displacement, thereby limiting efficiency.

Variable Valve Timing

Another method for controlling combustion phasing in an HCCI engine is through the use of variable valve timing.

Variable valve timing may include changing the valve phasing, valve lift, and/or total valve opening time. In typical internal combustion engines, the opening of intake and exhaust valves is controlled by cams with lobes that mechanically actuate the valves. A cam is in mechanical communication with the crankshaft or drive components in the engine such that the relationship between the cam and the other components of the engine remain set. More recently, significant work has been done on variable valve timing. In the simplest version of variable valve timing, the intake and/or exhaust cams have an adjustable relationship with respect to the crankshaft or other main drive components of the engine. That is, the cams may be adjusted such that the valves are opened earlier or opened later. However, in the simplest approach to variable valve timing, the total valve lift and the amount of time that the valve is open remains the same despite the change in relative phasing. More advanced versions of variable valve timing allow for variable valve lift as well as variations in the total time that the valve is open. In the most advanced versions, an electromechanical actuator directly controls the opening and closing of individual valves, such that all aspects of valve timing and lift may be very precisely controlled. Such a system is disclosed in SAE Paper 2000-01-0251, incorporated herein by reference.

Any of the known or yet to be developed approaches to variable valve timing may be used with an HCCI engine according to the present invention, either independently or in combination with any other aspect of the present invention. In one preferred embodiment, variable valve timing is used in an HCCI barrel engine. The use of advanced valve timing, wherein the valve lift may be precisely controlled, can partially replace the use of a throttle for controlling the amount of air and fuel mixture drawn into a combustion chamber. That is, if valves are opened to a lesser amount, power will be somewhat restricted since the flow of intake into the combustion chamber will be reduced.

Variable valve timing can be used to a certain extent to control combustion phasing in an HCCI engine according to the present invention. By delaying the opening of intake valves, or reducing the total lift or open time, the amount of combustible mixture of air and fuel introduced into the combustion chambers of the engine will be somewhat reduced. This has a similar affect to reducing the compression ratio of the engine. That is, reducing or delaying intake valve opening delays or prevents autoignition. Conversely, earlier valve opening (within certain limits) or higher lift or longer total opening time increases the amount of combustible mixture that may be drawn into the combustion chamber, and autoignition will occur earlier if certain conditions are met.

Variable exhaust valve timing can also be used in certain ways to affect combustion phasing. For example, if an exhaust valve remains open past top-dead center, as the piston begins to travel back down, some exhaust components may be drawn back into the combustion chamber. This will have a similar affect to exhaust and gas recirculation (EGR), as described below. Alternatively, the exhaust valve may be closed early or less lift may be used to cause more exhaust gas to remain in the cylinder.

Fuel Blending

Figure 31:
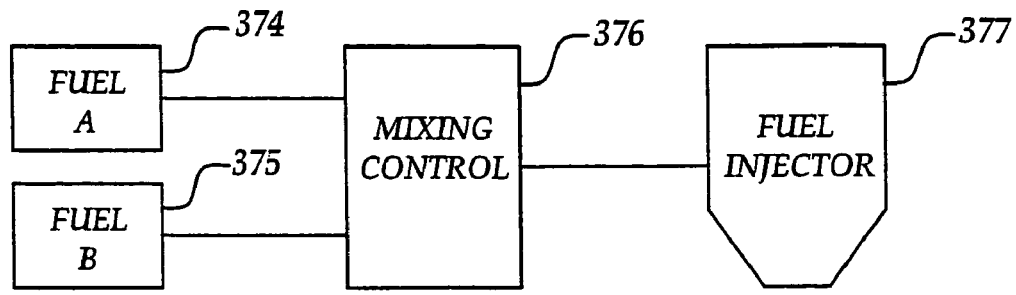
FIG. 31 is a diagram showing a fuel blending system for use with the present invention.

Combustion phasing may also be controlled by changing the mixture of two fuels with different propensities to autoignite. For example, if a first fuel is provided that very easily self-ignites and a second fuel is chosen that resists autoignition, a mixture of these two fuels, along with air, will have different propensities to autoignite depending on the ratio of the two fuels. Fuel blending is illustrated schematically at FIG. 31. A first fuel supply is shown at 374, a second fuel supply is shown at 375, and a mixing control is shown at 376. The mixing control varies the ratio of the first and second fuels provided to a fuel injector 377. Other approaches include individual fuel injectors for each fuel and/or completely separate fuel systems. Fuel blending may be used by itself as a control method for HCCI combustion phasing, or may be combined with any of the other aspects of the present invention.

EGR Control

Figure 32:
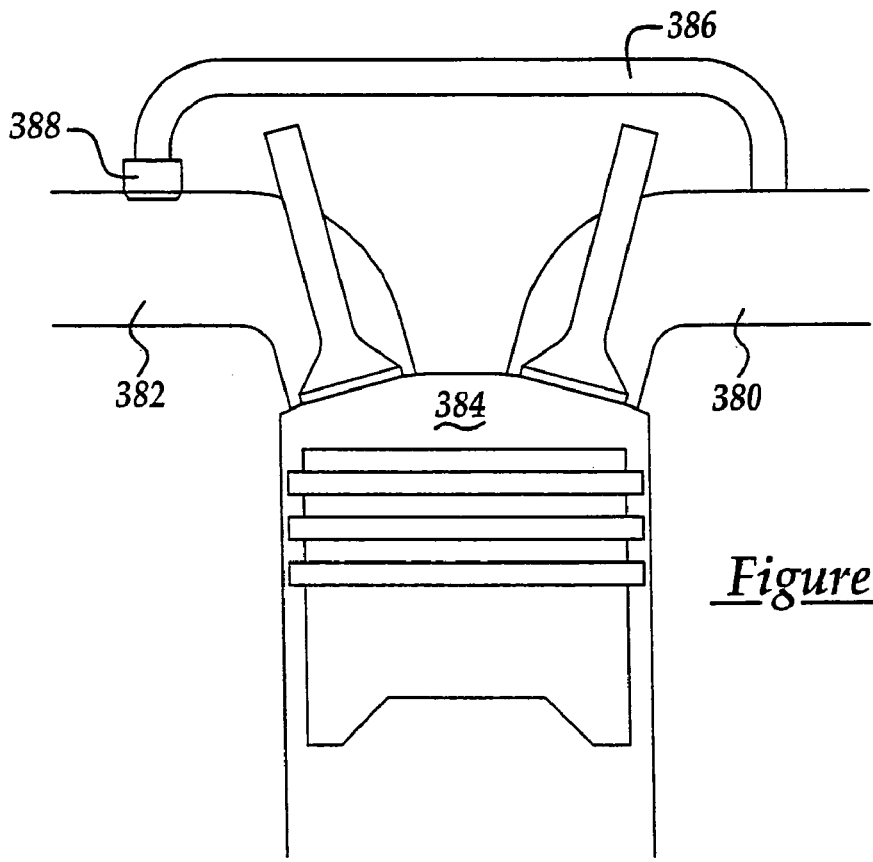
FIG. 32 is a schematic representation of a cylinder and a piston with an exhaust gas recirculation (EGR) system.

Referring to FIG. 32, the use of exhaust gas recirculation (EGR) is illustrated schematically. EGR recirculates exhaust gases from the exhaust runner 380 to the intake runner 382 so as to increase the amount of residual exhaust gas introduced into the combustion chamber 384. As known to those of skill in the art, some residual exhaust gas remains in the combustion chamber 384 after the exhaust stroke due to incomplete emptying of the combustion chamber 384. The amount of exhaust gas recirculated into the combustion chamber 384 may be increased using the EGR system, such as illustrated. In the illustrated embodiment, an EGR tube 386 extends between the exhaust runner and the intake runner. A control valve 388 controls the flow of exhaust gas into the intake runner 382. While this is illustrated for a single cylinder, EGR may be implemented such that exhaust from individual or collective exhaust passages is conducted to individual intake passages or to a general intake plenum. As discussed previously, a similar affect may be accomplished by controlling exhaust valve timing, lift, and opening interval so as to affect the amount of exhaust gas that remains in the combustion chamber or is drawn back into the combustion chamber. Within certain limits, increasing the amount of exhaust gas recirculation advances the combustion phasing, and reducing the amount of EGR delays combustion phasing in an HCCI engine. EGR-based control of HCCI combustion phasing may be used alone or in combination with any other aspects of the present invention. EGR also has applicability to combustion cycles other than HCCI.

Intake Air Temperature

Figure 33:
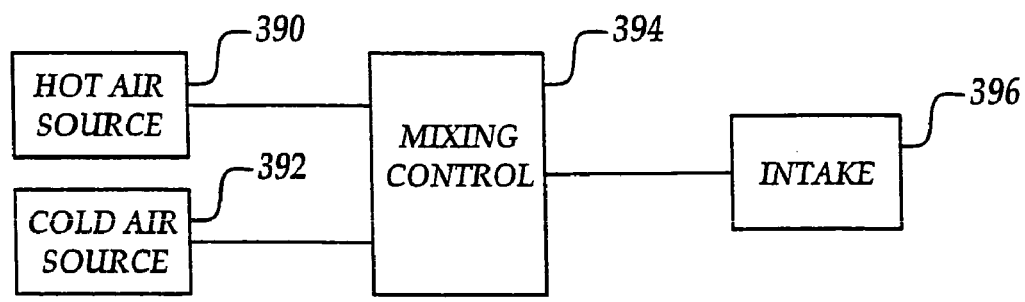
FIG. 33 is a block diagram showing an intake air temperature control system for use with the present invention.
Figure 34:
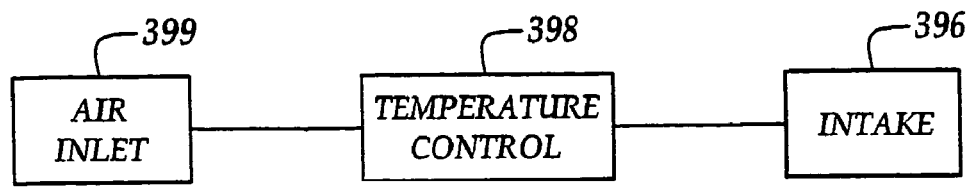
FIG. 34 is a block diagram showing an alternative embodiment of an intake air temperature control for use with the present invention.

HCCI combustion phasing may be somewhat controlled through varying the temperature of the intake air, air/fuel mixture or fuel. FIGS. 33 and 34 illustrate systems for adjusting the temperature of intake air provided to the combustion chamber. In FIG. 33, a hot air source 390 and a cold air source 392 are mixed using a mixing control 394 providing air to the intake 396 for the engine. In FIG. 34, a temperature control is provided in the air inlet 399 for altering the temperature of the air provided to the intake 396. The temperature control 398 may be a heating device or a cooling device, or both. Generally, increasing the intake air temperature advances combustion phasing, and decreasing the temperature delays combustion phasing. Air temperature control may be accomplished in a variety of ways, including using the exhaust flow or exhaust manifolds to mix with or increase the temperature of the intake air. Cooling devices such as intercoolers or compressor-based cooling systems may be used for cooling the intake air. Similar approaches may be used to adjust the temperature of the combustible mixture, as well as the temperature of the fuel. Air temperature based control of HCCI combustion phasing may be used alone or in combination with any other aspect of the present invention. Also, air temperature control may have some applicability in engines using other combustion strategies.

Supercharging

Figure 35:
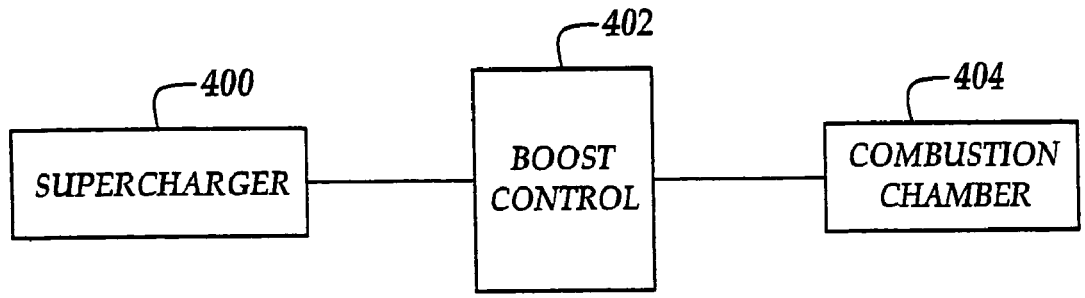
FIG. 35 is a diagram showing the use of supercharging for an engine according to the present invention.

FIG. 35 schematically illustrates the use of supercharging, another approach to controlling combustion phasing in an HCCI engine. A supercharger 400 creates pressurized intake air or a mixture of fuel and air, which is provided to the combustion chamber 404. Preferably, a boost controller 402 controls the level of pressure delivered to the intake. By increasing the pressure of air provided to the intake, combustion phasing can be advanced. Decreasing the pressure delays combustion. Various designs may be used for controlling boost levels, including upstream or downstream controls and wastegates. Various alternatives include the substitution of a turbocharger for a supercharger, as well as other methods of pressurizing the intake. The supercharger or turbocharger may be of any design, including an integrated supercharger as discussed in applicant's PCT priority document, incorporated herein by reference. A barrel engine may be constructed with a double-ended configuration. In a double-ended configuration, the track in the barrel engine communicates with pistons on opposite ends of the engine. For example, a single piston assembly may have a piston on one end of the engine, a portion that communicates with the track in the middle, and another piston at the other end. Cylinder bores at opposite ends of the engine receive the two ends of the piston assembly. An integrated supercharger may be provided by using the pistons and cylinders at one end of the engine to compress air to be provided to combustion chambers at the other end of the engine. Alternatively, combustion chambers and compression chambers may be mixed on each end of the engine.

Supercharging may be used by itself or in combination of any other aspect of the present invention for HCCI as well as other designs of engines. Supercharging has particular applicability to an engine that operates in an HCCI mode at some times and in a spark-ignited or diesel mode at other times. This is especially beneficial in combination with variable compression ratio. This allows great flexibility in combustion strategies, fuel usage, and other variables.

Cylinder Timing Equalization

Background

In multi-cylinder engines, there are typically minor cylinder-to-cylinder variations in such factors as combustion ratio, combustion chamber shape, intake and exhaust efficiency, temperature and other factors. These variations lead to slight variations in combustion characteristics. While this is true of all types of internal combustion engines, cylinder-to-cylinder variations are particularly of concern in an HCCI engine. Unlike in spark ignited or diesel engines, wherein the combustion event can be triggered by a spark plug or fuel injector, HCCI engines rely on autoignition of a compressed mixture of fuel and air. Therefore, slight cylinder-to-cylinder variations lead to variations in combustion phasing. This is particularly true as engines age and combustion residue builds up in individual cylinders. In the previously discussed methods of controlling HCCI combustion phasing, the combustion phasing of the entire engine was considered. That is, a control method of some type is used to advance or retard the overall combustion phasing of the engine. If some cylinders fire slightly earlier or later than others, the engine controller is forced to choose a combustion phasing best suited to the "weakest link." In other words, if one cylinder fires earlier than the others with respect to each cylinder's respective top-dead center, the engine controller is generally forced to adjust combustion phasing for all cylinders such that the early firing cylinder does not fire prematurely, and lead to engine damage. Alternatively, the engine controller can "split the difference" between early firing and late firing cylinders. Either approach is non-optimal. According to the present invention, several methods are provided for evening out cylinder-to-cylinder variations in combustion phasing. While not required for an HCCI engine according to the present invention, it is preferred that one or more of these approaches be used, as necessary, to optimize overall engine efficiency and performance. While especially beneficial to HCCI, some or all of the following control methods may also have applicability to other engine configurations and combustion strategies.

Corona Discharge Device

Figure 36:
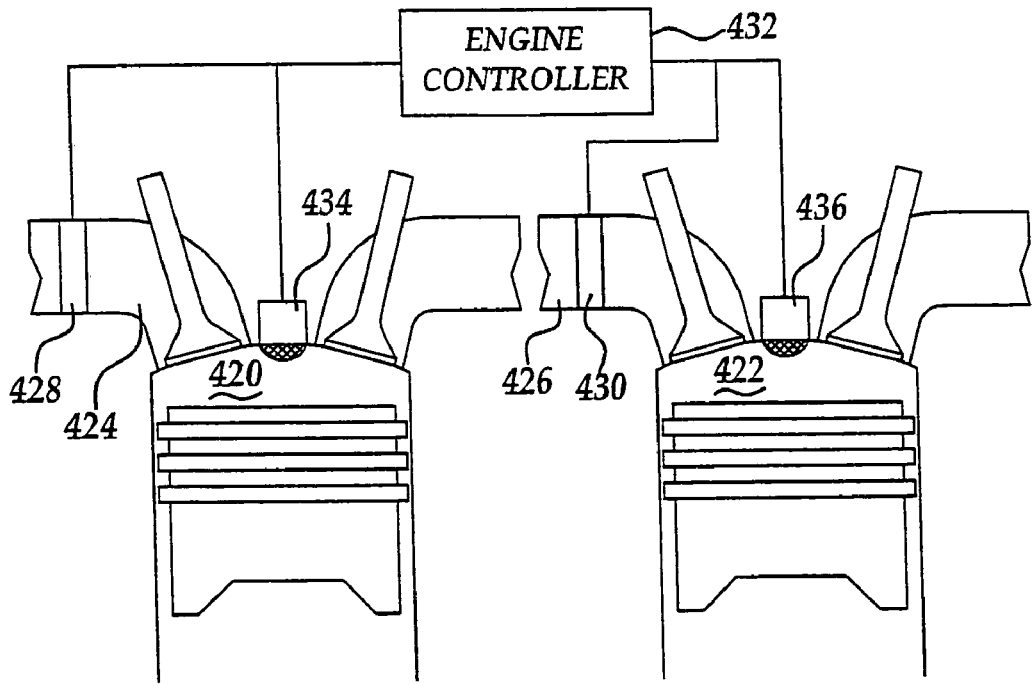
FIG. 36 is a schematic representation of an engine controller using two corona discharge devices to control combustion phasing in two combustion chambers.

FIG. 36 schematically represents a multi-cylinder engine with combustion chambers 420 and 422 defined between respective pistons and closed upper ends of combustion cylinders. While illustrated as a reciprocating piston design, it should be appreciated that many aspects of the present invention can be used with other internal combustion engine configurations, such as rotary and other configurations that do not have a reciprocating piston within a cylinder. A pair of intake runners 424 and 426 are shown feeding the respective combustion cylinders 420 and 422. Corona discharge devices 428 and 430 are provided in the intake runners 424 and 426, respectively. As discussed previously, corona discharge devices may be used to adjust combustion phasing in an HCCI engine. By providing individual corona discharge devices for each cylinder in a multi-cylinder engine, the combustion phasing in the individual cylinders may be controlled. Preferably, the corona discharge devices 428 and 430 are in communication with and under the control of an engine controller 432. Corona discharge devices may alternatively or additionally be provided in the combustion chambers 420 and 422, as shown at 434 and 436, respectively. Either or both of the corona discharge devices for each cylinder may be provided, with each provided device preferably being in communication with engine controller 432. In cylinders in which the peak of combustion needs to be advanced, the voltage, duty cycle or number of elements of the corona discharge device would be increased, while in cylinders in which the peak of combustion needs to be retarded in relation to the shaft angle the voltage or number of elements will be decreased or shut off completely. The opposite may also be true under certain circumstances.

The corona discharge devices may be used by themselves in the engine, or in combination with any other aspect of the present invention. As one alternative, a main corona discharge device may be provided to add radicals to the intake air for all cylinders, and additional corona discharge devices may be assigned to individual cylinders. Also, corona discharge devices may have applicability to other types of engines.

Water Injection

Figure 37:
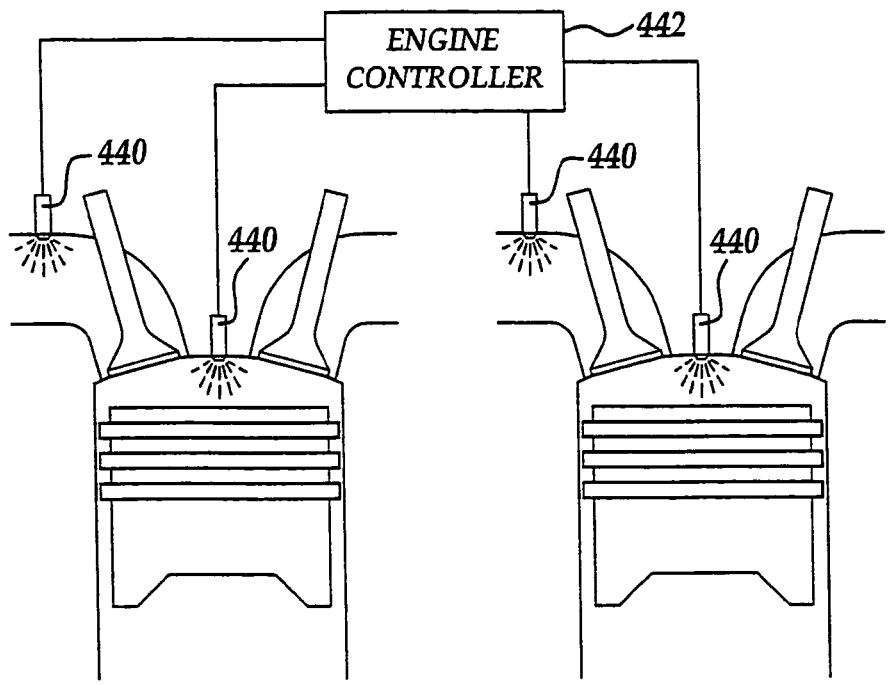
FIG. 37 is a schematic representation of an engine controller controlling multiple water injectors to control combustion phasing in two combustion chambers.

Referring now to FIG. 37, a multi cylinder engine is again illustrated schematically. Water injectors 440 are illustrated for introducing water into the intake tract or directly into the cylinders on a cylinder-by-cylinder basis. As discussed previously, water injection may be used to adjust combustion phasing. By coordinating water injectors for individual cylinders through the use of an engine controller 442, combustion phasing can be adjusted so as to optimize engine performance.

Cylinder Temperature Control

Figure 38:
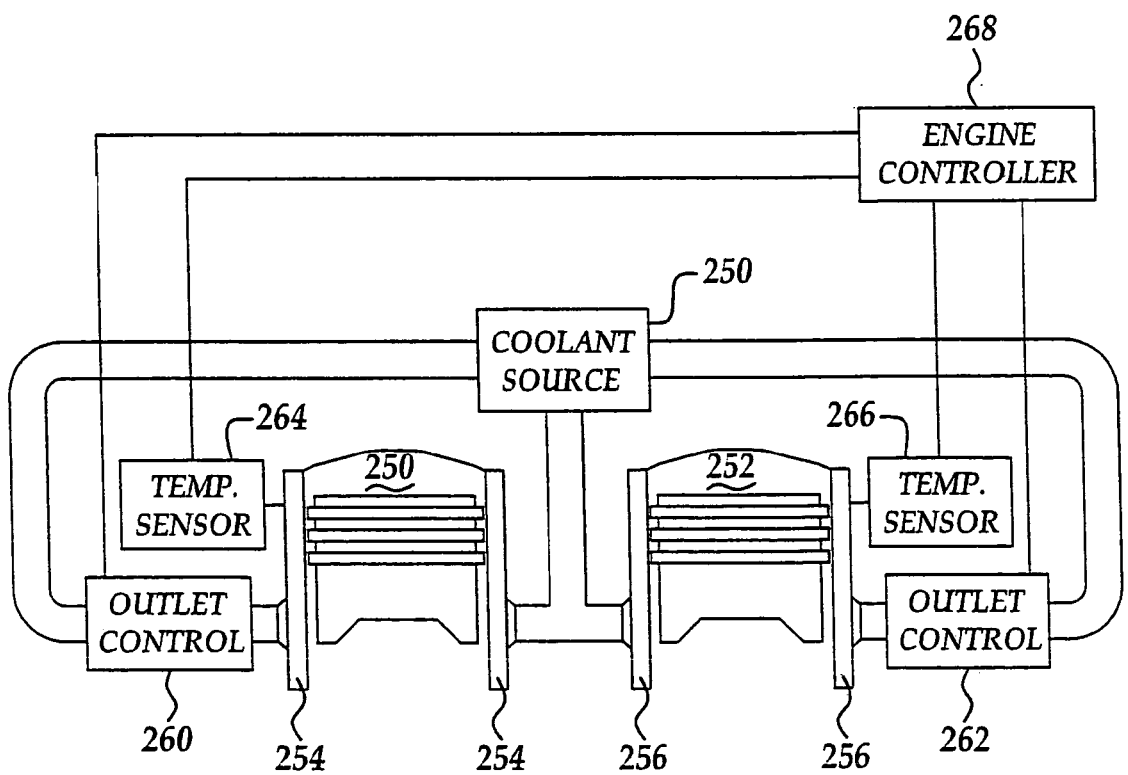
FIG. 38 is a schematic representation of an engine controller and a cylinder temperature control system for controlling combustion phasing in two combustion chambers.

Referring now to FIG. 38, an alternative approach to adjusting combustion phasing on a cylinder-by-cylinder basis will be described. Two combustion chambers 450 and 452 are schematically illustrated for a multi-cylinder engine. Coolant jackets 254 and 256 are shown for cooling the combustion chambers 250 and 252, respectively. As will be clear to those of skill in the art, numerous approaches may be used for cooling individual cylinders, including liquid cooling, oil cooling, air cooling, and other approaches. Also, in certain applications, auxiliary cooling may not be required. However, by adjusting cylinder temperature on a cylinder-by-cylinder basis, relative combustion phasing can be somewhat adjusted. Warmer cylinders will tend to combust somewhat earlier and cooler cylinders will tend to combust somewhat later. Typically, an engine cooling system provides coolant to all portions of the engine without individually controlling the temperature of certain parts of the engine. As illustrated in FIG. 38, the cooling system is designed to provide cylinder temperature control on a cylinder-by-cylinder basis. A coolant source 258 provides coolant to the coolant jackets 254 and 256. Individual outlet controls 260 and 262 control the flow of coolant past the individual cylinders, thereby control cylinder cooling. Temperature sensors 264 and 266 may be provided for each cylinder for monitoring purposes. The outlet controls and the temperature sensors may all be in communication with and under the control of an engine controller 268. Individual cylinder cooling may be achieved through other approaches, such as controlling the inlet of coolant to each cylinder or by adjusting the temperature of the coolant provided to an individual cylinder. For example, the engine may have sources of hot coolant and colder coolant and mix the two coolants to provide temperature control. Also, individual temperature sensors may not be required under certain control approaches. Instead, the engine controller may monitor relative combustion phasing using various approaches and then adjust the cylinder-by-cylinder temperature, or factors related to temperature such as coolant flow, so as to even out the cylinder combustion phasing. In one approach, a plurality of thermostats or coolant flow controllers is provided at a central point with each one providing coolant to an individual cylinder. This can act as a manifold for distribution of coolant. By centrally locating each of the flow controllers, servicing of the controllers may be simplified.

Alternative approaches include the use of oil or air cooling, with provisions for individual control for each cylinder.

Air-Fuel Ratio Variation

Another method to even out the cylinders would be to vary each cylinder's individual air-fuel ratio. Richer air-fuel mixtures will generally autoignite at lower pressures and temperatures than leaner air-fuel mixtures. Therefore, varying the air-fuel ratio will provide a means of evening out the cylinders. In cylinders that are slightly hotter than others due to uneven cooling capacity and in cylinders that have slightly higher compression ratios than others due to carbon deposits or poor tolerances used during manufacturing, the air-fuel ratio would be kept leaner than those of the other cylinders in order to retard the start of combustion so that it occurs at the ideal shaft angle. In cylinders which are cooler than others and in cylinders which have lower pressures than others due to wear, air-fuel ratios would be richer than those of the other cylinders to advance the start of combustion so that it occurs at the ideal shaft angle. As another alternative, air could be injected into each of the cylinders intakes or into the cylinders themselves in order to lean out the mixture.

Air Temperature Adjustment

Another method of evening out the cylinders would be to provide each cylinder with a mode of varying the temperature of its intake air. Varying the temperature of the intake air may be advantageous to air-fuel modulation for reasons of price, as it would only require that the engine have one or more injectors in the main intake. Although an option, it would not be necessary to provide a means of measuring the intake temperatures of each cylinder. Instead, the intake temperatures would be modulated by feedback from the combustion sensors, which should provide all necessary information. As with the case of modulating air-fuel ratios, large differences in intake temperature will cause significant variations in the power output of different cylinders.

EGR Control

Another method of evening out the cylinders would be to use different amounts of exhaust gas recirculation (EGR) for each of the cylinders. This method can reduce mixture reactivity if the exhaust gasses are relatively cool, or can increase mixture reactivity by increasing the temperature. The drawbacks with EGR are that responsiveness to changes in running conditions is typically slow due to the inertia of the gasses, although this problem could be addressed. As with air-fuel and temperature modulation, large amounts of EGR can reduce power output.

Control Strategies

In order to properly control combustion phasing, either for an overall engine or on a cylinder-by-cylinder basis, each cylinder may have its own corona discharge device or other control mechanism. Additionally, the control unit will need some method of monitoring either the start or peak of combustion in each cylinder so it can signal the proper components to adjust combustion phasing. It may be possible to connect one central sound or pressure sensing device to the control unit and compare its signal against the mechanical position of the engine in order to monitor the status of combustion. However, each cylinder will most likely require its own sound, pressure, heat or light-sensing device, the signal of which will be sent to the engine's control unit and compared against the mechanical position of the engine so that the fuel injector or CDD may be adjusted accordingly.

As stated earlier, all methods of evening out the cylinders may be used alone or in combination. It should also be noted that all of the methods of evening out the cylinders, alone or in combination, can be used to supplement or, in certain applications, possibly replace the variable compression ratio device.

As will be clear to those of skill in the art, the various aspects of the present invention may be altered or combined in various ways other than those illustrated or discussed, without departing from the scope or teachings of the present invention. It should be understood that the illustrated embodiments are provided for descriptive purposes, and many variations are possible. Terms used herein should be given their broadest interpretation. In some cases, Applicant has defined terms is particular ways for ease of description. Also, the headings used throughout the specification are not to be considered limiting in any way.

The invention claimed is:

1. A method of introducing a charge of hot gas into a combustion chamber of a homogenous charge compression ignition internal combustion engine, the method comprising the steps of:

providing a homogenous charge compression ignition internal combustion engine having a combustion chamber defined therein;

providing a secondary chamber in gaseous communication with the combustion chamber;

introducing a combustible mixture of air and fuel into the secondary chamber;

combusting the mixture of air and fuel in the secondary chamber so as to produce a hot gaseous combustion product;

passing the combustion product from the secondary chamber to the combustion chamber; and extinguishing the combustion product so as to create a hot gas as the combustion product passes from the secondary chamber to the combustion chamber;

whereby a hot gas is introduced into the combustion chamber.

2. The method according to claim 1, further comprising:
providing a spark ignition device in the secondary chamber, the device operable to introduce a spark into the secondary chamber; and
the combusting comprising introducing a spark from the spark ignition device to combust the mixture.

3. The method according to claim 1, further comprising:
providing a flame arrestor and the extinguishing step comprising passing the combustion product through the flame arrestor.

4. The method according to claim 1, wherein the combusting step comprises compressing the mixture in the secondary chamber until the mixture autoignites without the introduction of a spark.

5. The method according to claim 1, wherein the engine providing step comprises providing a barrel engine.

6. A method of controlling a homogenous charge compression ignition engine, comprising:
providing a homogenous charge compression ignition engine, comprising:
an engine housing
a first and a second cylinder defined in the engine housing;
an intake system operable to introduce a combustible mixture of air and fuel into the cylinders;
a first piston disposed in the first cylinder operable to compress the combustible mixture in the first cylinder until the mixture autoignites without the introduction of a spark or additional fuel;
a second piston disposed in the second cylinder operable to compress the combustible mixture in the second cylinder until the mixture autoignites without the introduction of a spark or additional fuel;
introducing ions and free radicals into the combustible mixture in the first cylinder so as to adjust the mixture reactivity of the combustible mixture and the combustion phasing for the first cylinder;
introducing ions and free radicals into the combustible mixture in the second cylinder so as to adjust the mixture reactivity of the combustible mixture and the combustion phasing for the second cylinder;
controlling the introduction of ions and free radicals to the first and second cylinders so as to selectively adjust the relative combustion phasing of the first and second cylinders.

7. The method according to claim 6, wherein the engine providing step comprises providing a barrel engine.

* * * * *

UNITED STATES PATENT AND TRADEMARK OFFICE
CERTIFICATE OF CORRECTION

| | |
|---|---|
| PATENT NO. | : 7,469,662 B2 |
| APPLICATION NO. | : 11/255804 |
| DATED | : December 30, 2008 |
| INVENTOR(S) | : C. Russell Thomas |

Page 1 of 1

It is certified that error appears in the above-identified patent and that said Letters Patent is hereby corrected as shown below:

Column 11, line 17, replace "combustable" with --combustible--
Column 11, line 34, replace "combustable" with --combustible--
Column 11, line 35, replace "combustable" with --combustible--
Column 11, line 56, replace "combustable" with --combustible--
Column 17, line 43, replace "combustable" with --combustible--
Column 19, line 33, replace "autoigntion" with --autoignition--
Column 22, line 14, replace "combustable" with --combustible--
Column 23, line 20, replace "combustable" with --combustible--
Column 23, line 24, replace "combustable" with --combustible--
Column 25, line 42, replace "combustable" with --combustible--

Signed and Sealed this

Twenty-first Day of April, 2009

JOHN DOLL
*Acting Director of the United States Patent and Trademark Office*